United States Patent [19]

Miyakoshi et al.

[11] 4,406,475

[45] Sep. 27, 1983

[54] FRONT WHEEL SUSPENSION SYSTEM FOR MOTORCYCLES

[75] Inventors: Shinichi Miyakoshi, Fujimi; Tokio Isono, Tokyo, both of Japan

[73] Assignee: Honda Giken Kogyo Kabushiki Kaisha, Tokyo, Japan

[21] Appl. No.: 243,052

[22] Filed: Mar. 12, 1981

[30] Foreign Application Priority Data

| Mar. 17, 1980 | [JP] | Japan | 55-33752 |
| Mar. 21, 1980 | [JP] | Japan | 55-37758[U] |
| Apr. 10, 1980 | [JP] | Japan | 55-48423[U] |
| Nov. 17, 1980 | [JP] | Japan | 55-161615 |
| Nov. 17, 1980 | [JP] | Japan | 55-164420[U] |

[51] Int. Cl.³ .............................. B62K 25/04
[52] U.S. Cl. ................... 280/277; D12/110; 180/229; 280/279
[58] Field of Search ............... 280/277, 276, 278, 279, 280/281 R, 284, 666; 180/219, 229; D12/110, 111

[56] References Cited

U.S. PATENT DOCUMENTS 4,016,945  4/1977  Shibata .................. 180/229
4,171,729 10/1979 Shibata .................. 180/229
4,212,481  7/1980  Ribi ....................... 280/276

FOREIGN PATENT DOCUMENTS 30306   6/1981 European Pat. Off. ......... 280/277
32170   7/1981 European Pat. Off. ......... 280/277
2418742 11/1979 France ........................... 280/277

Primary Examiner—David M. Mitchell
Assistant Examiner—Mitchell J. Hill
Attorney, Agent, or Firm—Irving M. Weiner; Pamela S. Burt; John L. Shortley

[57] ABSTRACT

A front wheel suspension system for motorcycles wherein only one front shock absorber is provided and is arranged adjacent the upper part of the front surface of an upper fork. The shock absorber and at least one link mechanism forming a quadrilateral on the side are connected with each other through a rod functioning as a load transmitting member. The number of shock absorbers is thus reduced, the weight of the suspension system is reduced, the moment of inertia required to rotate the suspension system to the right and left is reduced, and the shock absorber is protected from being adversely affected by mud or the like.

32 Claims, 37 Drawing Figures

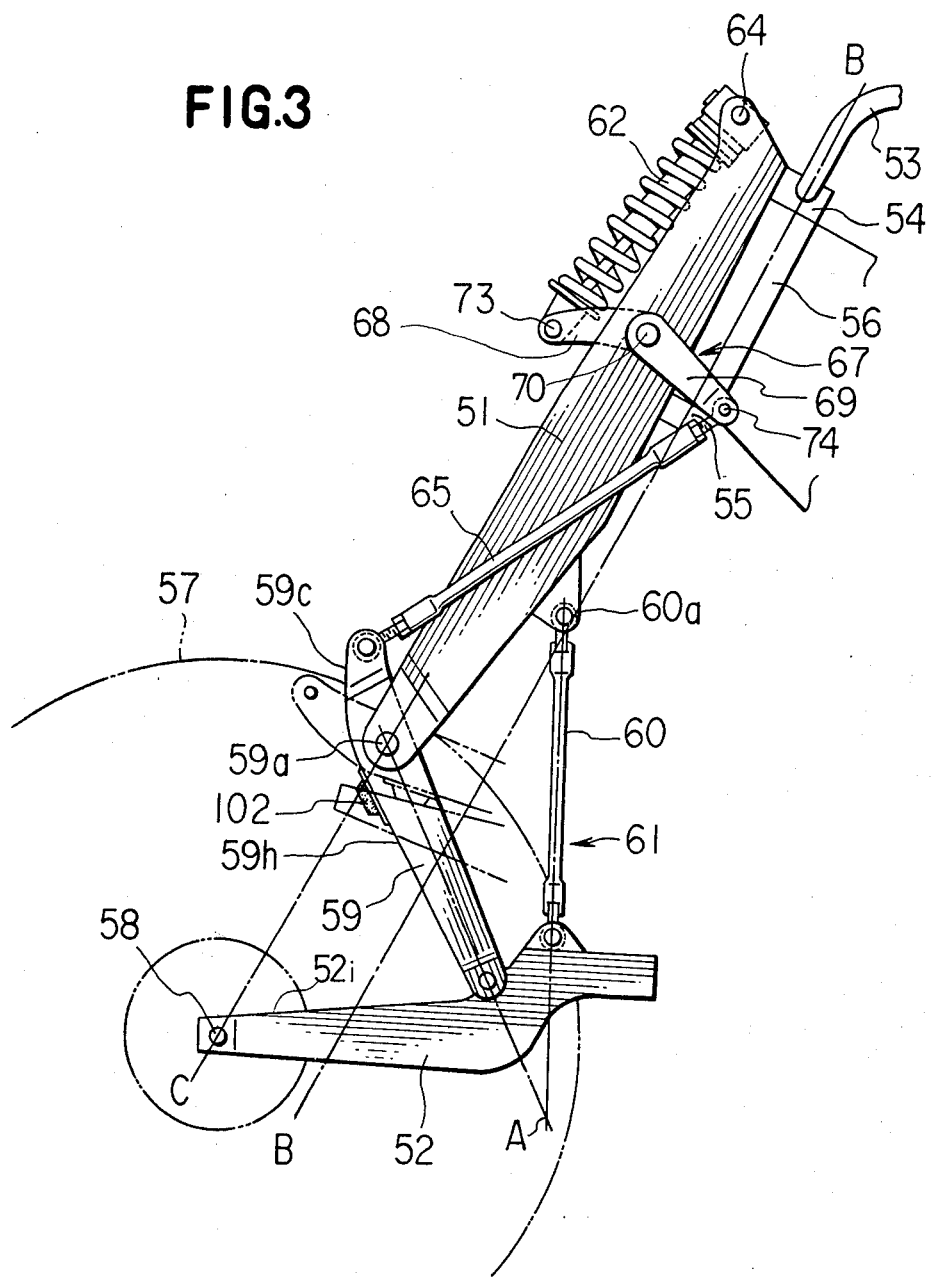

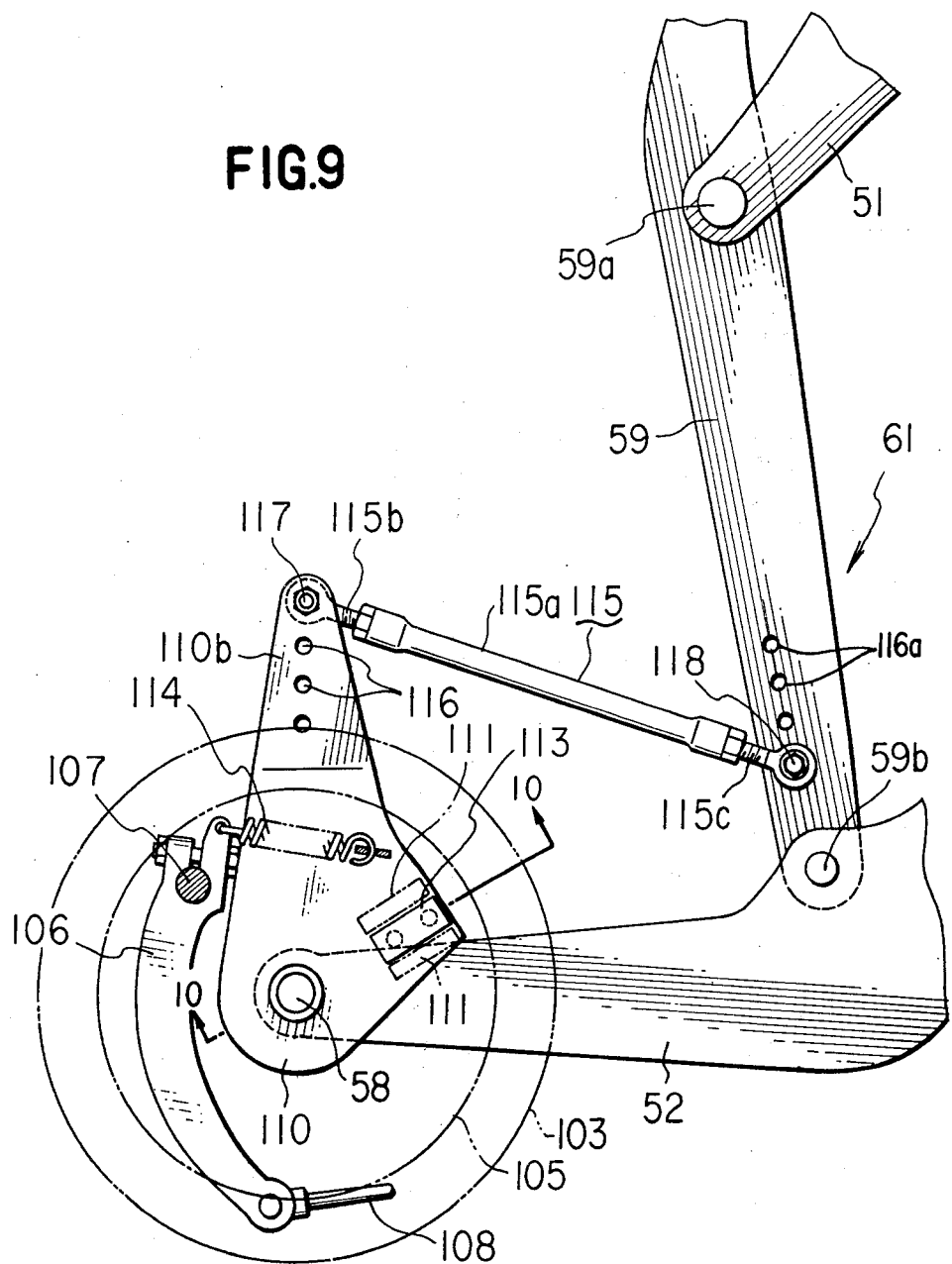

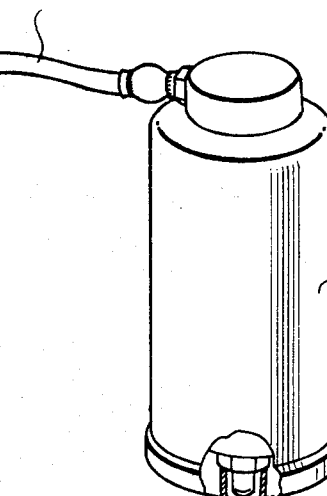
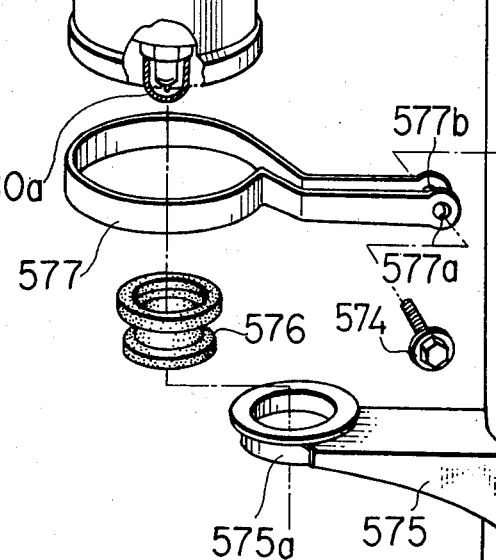
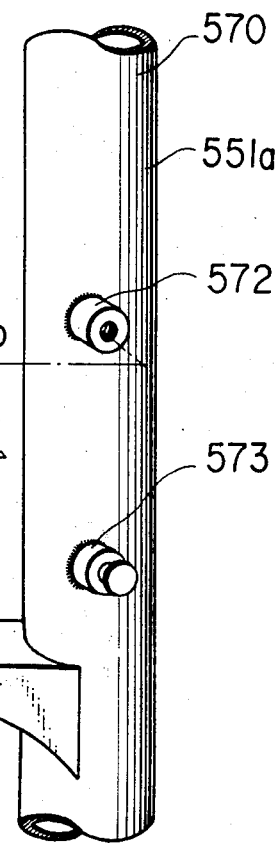
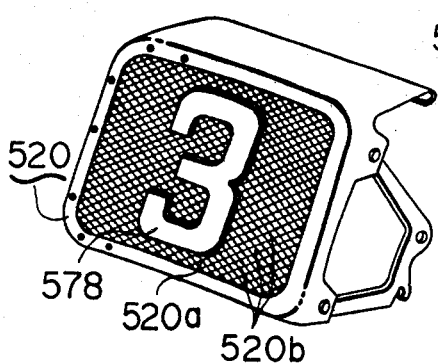
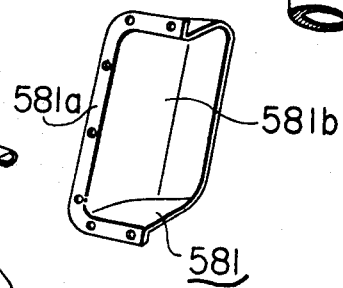
FIG.29
FIG.30

FRONT WHEEL SUSPENSION SYSTEM FOR MOTORCYCLES

BACKGROUND OF THE INVENTION

1. Field of the Invention

The present invention relates to a front wheel suspension system for suspending a front wheel of a motorcycle, of the type wherein a link mechanism of the suspension system forms a quadrilateral on the side.

2. Description of Relevant Art

The conventional front wheel suspension system generally employed for motorcycles is of a telescopic type wherein a front fork for suspending a front wheel is formed of a retractable forked pipe and bottom cases.

A new type of suspension system is disclosed in U.S. Pat. No. 4,212,481 issued July 15, 1980. In such suspension system, a front fork is formed of an upper fork pivoted and held rotatably at the right and left sides of a vehicle body and a lower fork supporting a front wheel, and a link mechanism forming a quadrilateral on the side is provided on each side to connect both forks by two front and rear arms. When such link mechanism is deformed during operation, the front wheel will move up and down following the irregularities of the road surface and, when the two arms are diagonally downwardly converged to be non-parallel, the axle of the front wheel will be able to move up and down along a path substantially parallel with the axis of rotary operation of the handlebar and close to a straight line path. A shock absorber absorbing and cushioning the movement of the front wheel with the deformation of the link mechanism is provided on each side between two members of the two arms and lower forks, or between one member of the two arms and lower forks and the upper fork.

The advantages afforded by the aforesaid new type of suspension system wherein the link mechanism forms a quadrilateral on the side are that, due to the link mechanism, the front wheel moves more smoothly and the rigidity of the suspension system can be elevated so as to be higher than that of the telescopic type having sliding resistances between the forked pipe and bottom cases when extended and retracted. Further, the moving stroke of the front wheel can be enlarged to the extent that the property of the front wheel in following the irregularities of the road surface will be improved, and with the thus obtained large stroke, the extension and retraction of the shock absorber may be small and therefore the shock absorber can be made to be small and lightweight.

However, the aforesaid new type of suspension system also has a number of attendant disadvantages. Because two shock absorbers are provided, i.e., one for each of the two link mechanisms on the right and left sides, the weight of the suspension system is undesirably heavy. Further, the weight is so heavy that there is a problem in that the moment of inertia required to rotate the suspension system to the right and left by means of the handlebar is large. Because the shock absorber is mounted between the members forming the link mechanism, the position of the shock absorber is so close to the road surface as to cause a problem in that the shock absorber is likely to be adversely affected by mud or the like.

The present invention effectively eliminates the foregoing problems, while at the same time maintaining the advantages of a front wheel suspension system of the type wherein the link mechanism forms a quadrilateral on the side.

SUMMARY OF THE INVENTION

The present invention provides a front wheel suspension system for motorcycles wherein at least one first link mechanism forming a quadrilateral on the side is formed by connecting an upper fork laterally pivotally connected to a vehicle body and a lower fork supporting a front wheel with each other through a front arm and a rear arm. The movement of the front wheel in following the irregularities of a road surface with deformation of the link mechanism is absorbed and cushioned by only one front shock absorber which is arranged adjacent an upper part of a front surface of the upper fork. The link mechanism and the shock absorber are connected with each other through at least one rod.

An object of the present invention is to provide a front wheel suspension system for motorcycles wherein a shock absorber is arranged at the upper part of the front surface of an upper fork so that only one shock absorber is employed, and such shock absorber and at least one link mechanism forming a quadrilateral on the side are connected with each other through a rod functioning as a load transmitting member.

In accordance with the present invention, because the number of shock absorbers is reduced to be fewer than those employed with the known arrangement, the weight of the suspension system is desirably reduced and the moment of inertia required to rotate the suspension system to the right and left is also reduced. Further, because the shock absorber is arranged at a high position in the suspension system, the shock absorber will not be detrimentally affected by mud or the like.

Another object of the present invention is to provide a front wheel suspension system for motorcycles wherein, when a front wheel moves upwardly, a shock absorber will be able to be compressed by a tensile load acting on a road so that the rod can be advantageously employed with respect to strength.

Various preferred embodiments of the present invention will be described in detail hereinbelow in conjunction with the accompanying drawings, from which the above and further objects, advantages and features of the present invention will become apparent.

BRIEF DESCRIPTION OF THE DRAWINGS

FIG. 3 is a side view of the system shown in FIG. 2.

FIG. 9 is a side view of the distal part of the lower fork, showing an antidiving mechanism.

FIG. 29 is a disassembled view showing a method of fitting the sub-tank to the upper fork.

FIG. 30 is a perspective view showing the identification plate and a wind guiding member in disassembled form.

DETAILED DESCRIPTION OF PREFERRED EMBODIMENTS

Figure 1:
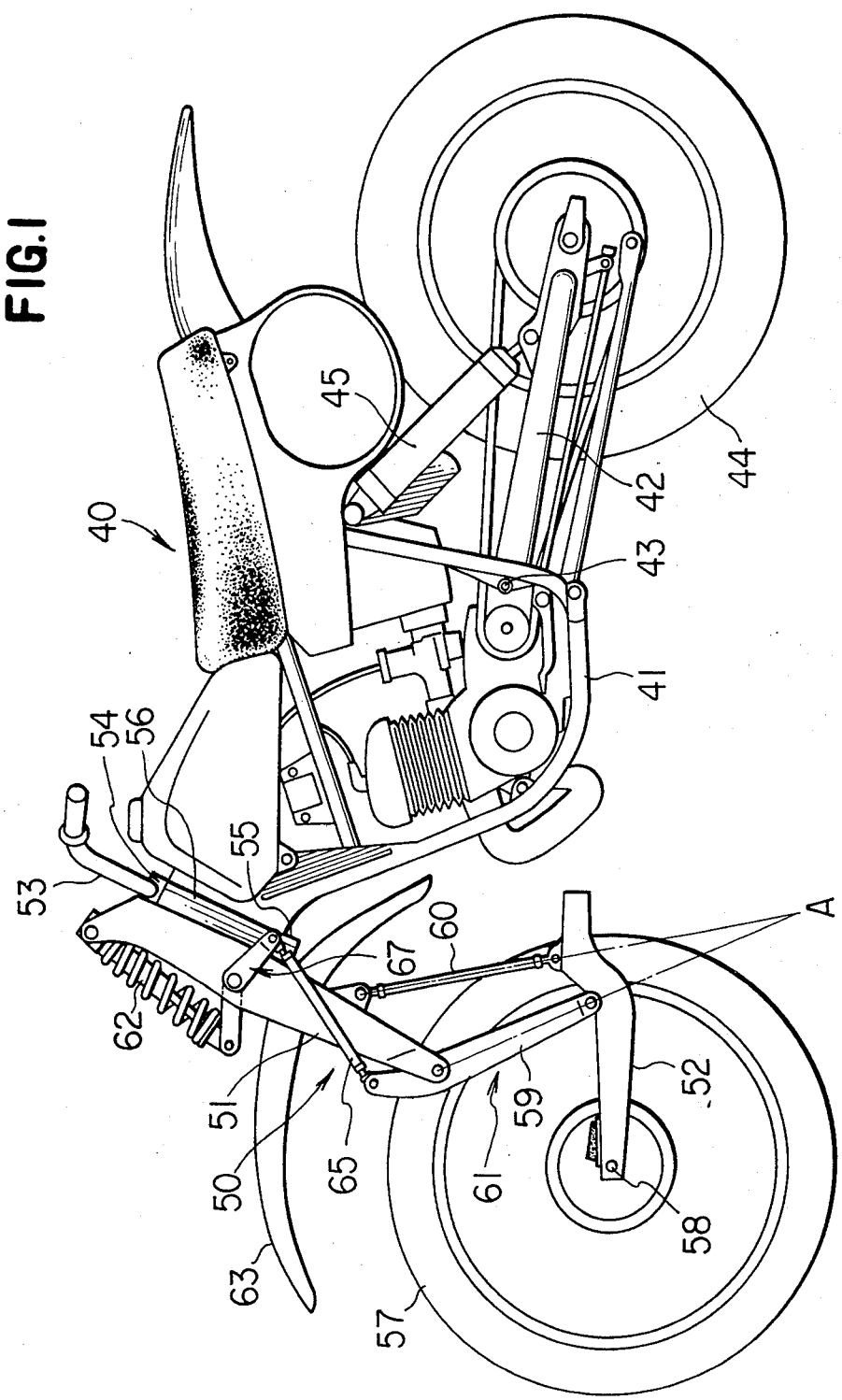
FIG. 1 depicts a general side view of a motorcycle.

With reference to FIG. 1, the front end of a rear wheel suspending rear fork 42 is connected so as to be rockable in the veritcal direction through a pivot shaft 43 to a vehicle body frame 41 of a motorcycle 40, and a shock absorber 45 is arranged on each side between the rear fork 42 supporting a rear wheel 44 at the rear end and the upper part of the vehicle body frame 41. The shock absorber 45 thus absorbs and cushions the movement of the rear wheel 44 in following the irregularities of the road surface.

Figure 2:
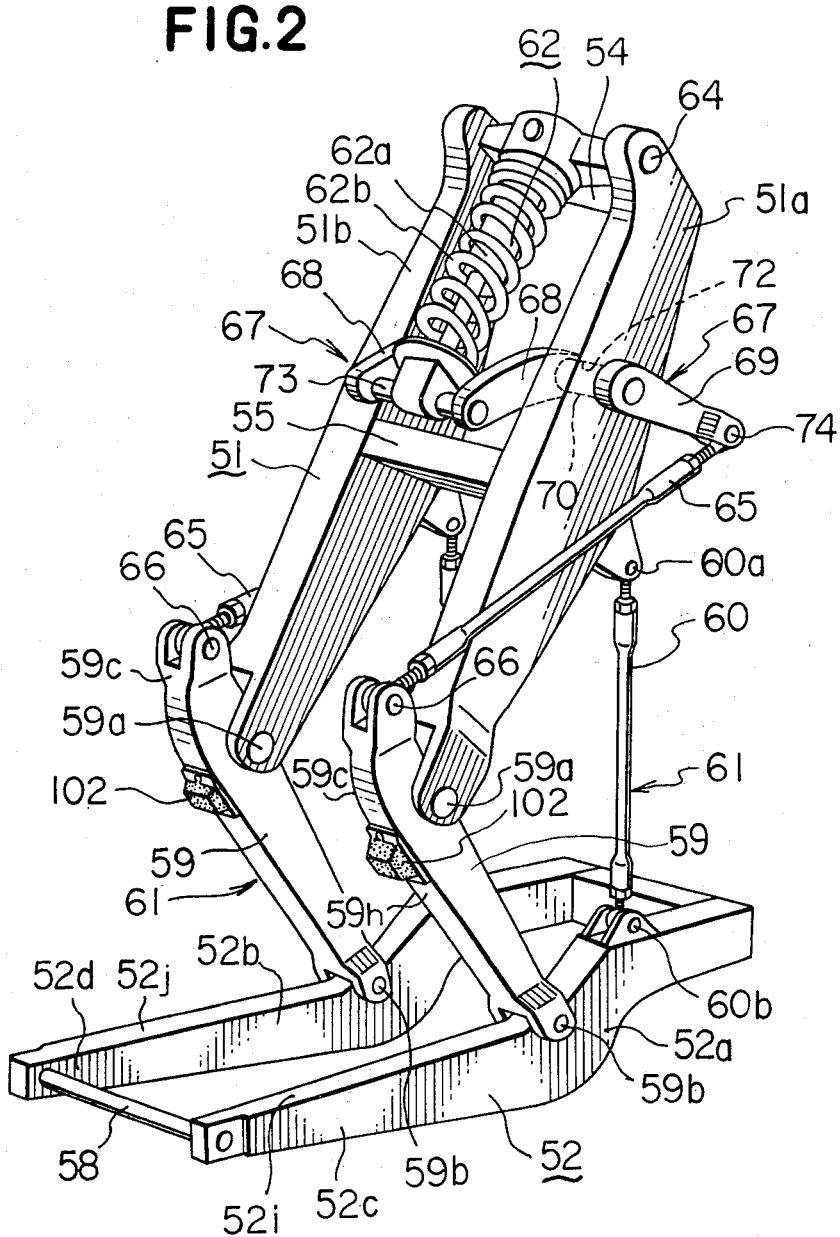
FIG. 2 is a perspective view of a front wheel suspension system.

A front wheel suspending front fork 50 is formed of an upper fork 51 and a lower fork 52. The upper fork 51 is pivoted and held rotatably at the right and left in the front part of the vehicle body so as to be steered by a handle 53. As shown in FIG. 2, the upper fork 51 is formed by connecting right and left side members 51b and 51a with a top bridge 54 and a bottom bridge 55. In FIG. 1, a head pipe 56 fixed to the front end of the vehicle body frame 41 is inserted between the bridges 54 and 55 and a stem shaft is inserted through the top bridge 55 so that the upper fork 51 is pivotable and held to the vehicle body and the head pipe 56 serves as a rotation center shaft of the upper fork 51.

The lower fork 52 supports a front wheel 57. As shown in FIG. 2, a front wheel axle 58 is arranged at the front ends of the right and left side members 52b and 52a forming the lower fork 52, so as to support the front wheel 57 at the front end of the lower fork 52.

The upper fork 51 and lower fork 52 are connected with each other through two front arms 59 and two rear arms 60, and respective upper and lower ends of the arms 59 and 60 are rotatably pivoted to both forks 51 and 52 through shafts 59a, 59b, 60a and 60b so that a link mechanism 61 forming substantially a quadrilateral on the side, including the upper fork 51 as a fixed link and the lower fork 52 and arms 59 and 60 as movable links, is formed. As shown in FIG. 2, the respective two front and rear arms 59 and 60 are provided on the right and left and the side members 51a, 51b and 51a, 52b of the forks 51 and 52 are connected through two sets of the arms 59 and 60, each set having two arms 59 and 60, so that two link mechanisms 61, having substantially the same structure and deformation characteristics, are present on either side.

In the above-described structure, the axle 58 is arranged between substantially horizontal forward extensions 52c and 52d of the side members 52a and 52b of the lower fork 52 and the lower ends of the arms 59 and 60 are pivoted respectively to the rear parts of the extensions 52c and 52d. Further, on either side, the arms 59 and 60 have their respective angles of inclination set so as to converge rearwardly downwardly so that their rearwardly downwardly extended imaginary axial lines intersect at a point A (FIG. 3).

A front wheel cushioning shock absorber 62 is arranged above a front fender 63 and adjacent the upper front surface of the upper fork 51 in front of the handlebar 53. As shown in FIG. 2, the single front shock absorber 62 is provided in the central part in the right-and-left direction of the upper fork 51. The shock absorber 62 comprises a combination of a gas pressure type, liquid type or gas-and-liquid type damper 62a and a coil spring 62b. The upper end of the shock absorber 62 is connected so as to be rockable substantially in the front and rear direction through a shaft 64 to the top parts of the side members 51a and 51b of the upper fork 51. Because only one front shock absorber is thus used, the overall weight of the suspension system is reduced and, by virtue of such reduction in weight, the moment of inertia when rotating the suspension system to the right and left with the head pipe 56 as a center can be minimized. Further, because it is possible to arrange the shock absorber 62 near the head pipe 56, the moment of inertia can be further minimized. Because the shock absorber 62 is positioned at a high position in the suspension system, the shock absorber 62 can be prevented from being adversely affected by mud or the like.

Each link mechanism 61 and the shock absorber 62 are connected with each other through a rod 65 which functions as a load transmitting member. As shown in FIG. 2, two rods 65 are resepctively provided on the right and left sides in the same manner as the link mechanism 61, so that deformations of the right and left link mechanisms 61 and 61 are transmitted to one shock absorber 62 through the respective rods 65. On either side, the link mechanism 61 and the rod 65 are connected with each other by pivotally connecting the lower end of the rod 65 through a shaft 66 to the front arm 59 at the upwardly extended tip 59c thereof, above the connecting part 59a at which the front arm 59 is pivotally connected to the upper fork 51. The upper end of each rod 65 and the lower end of the shock absorber 62 are connected with each other through a lever means 67 which functions to turn the load transmitting direction.

The lower end of the rod 65 is connected to the tip 59c of the arm 59 as described above so that, when the shock absorber 62 is compressed by the upward movement of the front wheel 57 to generate a shock absorbing force, the rod 65 serves as a tension rod which is advantageously strong. In order to reduce the moment of inertia, the right and left rods 65 and 65 are arranged adjacent to the outside surfaces of the side members 51a and 51b of the upper fork 51 so as to be as close as possible to the head pipe 56.

The front wheel 57 following the irregularities of the road surface is moved upwardly by the deformation of the link mechanism 61. This deformation will be effected when, as shown in FIG. 3, the arms 59 and 60 rotate in the counterclockwise direction with the shafts 59a and 60a as respective centers and the lower fork 52 moves upwardly, while rotating with the intersection A as a momentary center. Therefore, the front wheel axle 58 will move upwardly along a substantially linear path C—C substantially parallel with an axial line B—B about which the handlebar 53 rotates. The rod 65 will be pulled down by a downward tensile load due to the counterclockwise rotation of the arm 59, and the downward load will be turned to an upward load by the lever means 67. Therefore, the shock absorber 62 will be compressed, the upward movement of the front wheel 57 will be absorbed by the shock absorber 62, and a shock absorbing force will be generated. The front wheel 57 will be moved downwardly while being cushioned by the shock absorber 62 generating a shock absorbing force even when it is extended.

As will be understood from the foregoing description, the weight of the shock absorber 62 will not act on the movable links 52, 59 and 60 of the link mechanism 61, and therefore the link mechanism 61 will be deformed without affecting the weight of the shock absorber 62, and the property of the front wheel 57 in following the irregularities of the road surface will be improved. Further, because the shock absorber 62 is arranged in a position which is open to the front, maintenance such as fitting or removing of the shock absorber 62 will be facilitated.

Figure 4:
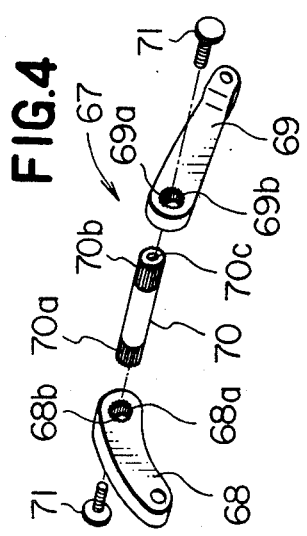
FIG. 4 is a view of a disassembled lever means.

As shown in FIG. 4, the lever means 67 is formed of the combination of front and rear lever members 68 and 69 and a rotary shaft 70. Holes 68a and 69a provided with teeth 68b and 69b on their inner peripheral surfaces are respectively formed at the rear end of the front lever member 68 and the front end of the rear lever member 69, and teeth 70a and 70b such as serrations corresponding respectively to the teeth 68b and 69b are formed on outer peripheral surfaces of both ends of the rotary shaft 70. The holes 68a and 69a of the lever members 68 and 69 are fitted on the shaft ends of the rotary shaft 70 so that the teeth 68b are engaged with the teeth 70a and the teeth 69b are engaged with the teeth 70b. Screws 71 and 71 inserted in the holes 68a and 69a are threadedly engaged and fastened in female screw holes 70c formed in both end surfaces of the rotary shaft 70, so as to thus assemble the three members 68, 69 and 70. Such assembly is made by rotatably fitting the shaft 70 through a bearing hole 72 formed in the right-and-left direction through the side member 51a of the upper fork 51, as shown in FIG. 2, before arranging the lever members 68 and 69 inside and outside of the side member 51a. The same assembly is provided on the other side member 51b. The lower end of the shock absorber 62 is connected to a shaft 73 arranged between the front ends of the front lever members 68 and 68 of the right and left lever means 67 and 67. The upper end of each rod 65 is connected through a shaft 74 to the rear end of the rear lever member 69.

With the lever members 68 and 69 combined with the rotary shaft 70 through the teeth 68b, 69b, 70a and 70b as described above, the respective open angles of the lever members 68 and 69 with the rotary shaft 70 as a center is selectively variable. The advantages thus afforded comprise adjustability of the shock absorbing force of the shock absorber 62 in response to road surface conditions and adjustability of the vehicle height. In order to attain such advantages, it is not necessary that both of the lever members 68 and 69 as combined be selectively variable in their open angles. In other words, one lever member may be formed integrally with the shaft 70 or only one lever member may have a selectively variable open angle with the shaft. It is sufficient that the open angle between the two lever members 68 and 69 extending on the opposite sides with respect to each other be variable. Further, the advantages of forming the lever means 67 by combining the three members 68, 69 and 70 as described with regard to the present embodiment are that, when the shock absorber 62 is compressed by the tensile load of the rod 65, the lever members 68 and 69 are substantially subjected to a bending force and the rotary shaft 70 primarily receives torsional load, thus desirably distributing the tensile load among the three members 68, 69 and 70. This is advantageous from the standpoint of strength.

It is also possible, by making the lengths of the rear arm 60 and the rod 65 variable, to adjust the shock absorbing force of the shock absorber 62 according to the road surface conditions and to adjust the vehicle height and the distance between the wheel and base.

Figure 5:
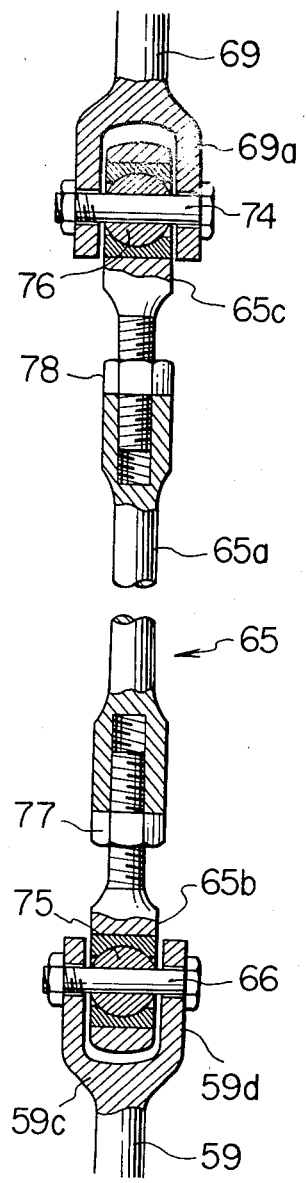
FIG. 5 is a sectioned view of an essential part showing the structure of a rod connecting a link mechanism which forms a quadrilateral on the side and a shock absorber with each other.

An arrangement in which the length of the rod 65 is made variable is shown in FIG. 5. The structure of the arm 60 is substantially the same as that of rod 65, and accordingly a detailed description of arm 60 is omitted.

The rod 65 comprises a main rod 65a and threaded rods 65b and 65c threadedly engaged in clockwise and counterclockwise threaded relation at both ends of the main rod 65a. The threaded rods 65b and 65c are inserted respectively in forked end parts 59d and 69a of the tip 59c of the arm 59 and the lever member 69. The threaded rods 65b and 65c are connected respectively to the end parts 59d and 69d through the shafts 66 and 74 which comprise bolts. Respective pivotal connections are made by inserting the shafts 66 and 74 respectively through pillow balls 75 and 76 enclosed and held by the threaded rods 65b and 65c so that the rod 65 is pivotable with respect to the arm 59 and lever member 69 by the rolling actions of the balls 75 and 76. By rotating the body 65a with the locking nuts 77 and 78 thereof loosened, the length of the rod 65 (of a turnbuckle type) may be adjusted.

Figure 6:
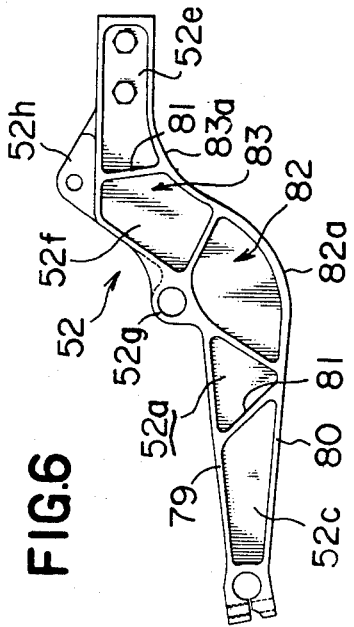
FIG. 6 is a side view of a lower fork.

When the shock absorber 62 is compressed by the upward movement of the front wheel to generate a shock absorbing force, a large load will act around the joint portions connecting the two arms 59 and 60 to the lower fork 52. Therefore, in the present invention, the side contour of the lower fork 52 is formed as shown in FIG. 6. The side contour of the left side member 52a of the right and left side members 52b and 52a forming the lower fork 52 is shown in FIG. 6, and the contours of the members 52a and 52b formed with the same side contours will thus be described with reference to the member 52a. The member 52a is made of a lightweight metal material such as an aluminum alloy, is provided with reinforcing ribs 81 arranged between upper and lower outer edges 79 and 80, and is molded integrally with the forward extension 52c, rearward extension 52e and an inclined base 52f connecting the extensions 52c and 52e. Bosses 52g and 52h respectively connecting the lower ends of the two arms 59 and 60 are formed at different levels at the respective upper surfaces of the connecting part 82 of the extension 52c and the base 52f and the connecting part 83 of the base 52f and the extension 52e. The connecting parts 82 and 83 are respectively continuously provided between the extension 52c and the base 52f and between the base 52f and the extension 52e. Respective lower surfaces 82a and 83a of the connecting parts 82 and 83 are naturally curved. The lower fork 52 thus has its connecting portion between the arms 59 and 60 smoothly curved in the side contour. Therefore, the load acting on the lower fork 52 when the shock absorber 62 is compressed will cause no localized stress concentration and will be dispersed. It is thereby also possible to reduce the weight of the lower fork 52.

Figure 7:
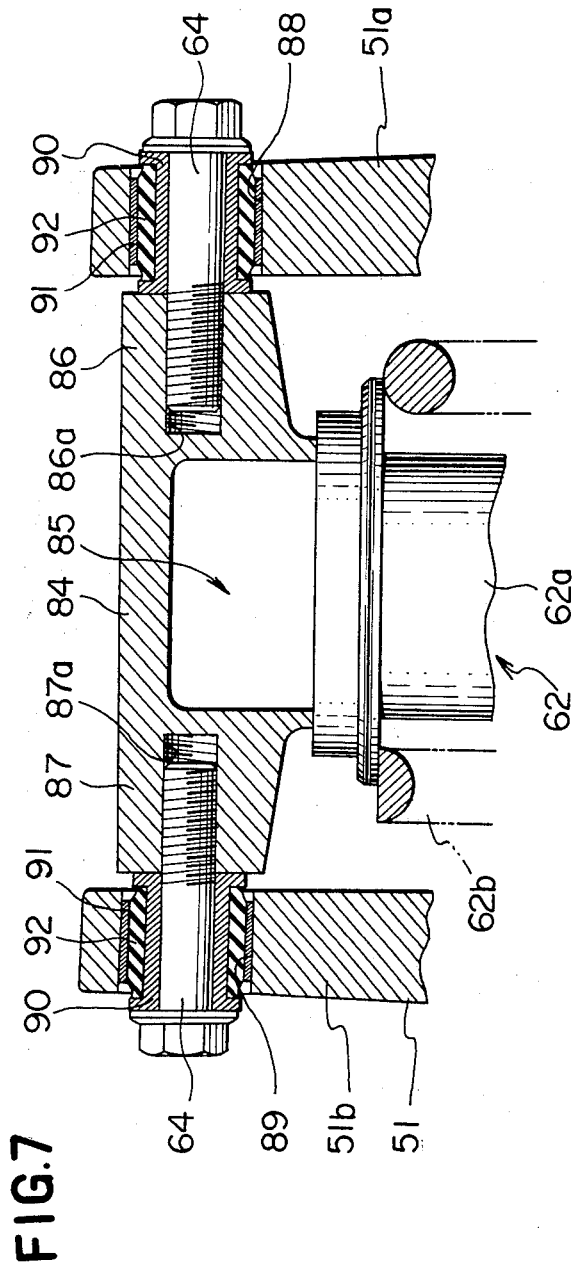
FIG. 7 is a sectioned view, shown from the front, depicting the connection of an upper fork and the upper end of the shock absorber.

When the shock absorber 62 is compressed, a large load will also act on the upper end of the shock absorber 62 connected to the upper fork 51. An upper part 84 of the damper 62a of the shock absorber 62 shown in FIG. 7 is thick block-shaped so that, if the damper 62a is of a pneumatic type for example, the interior of the upper part 84 will define a gas chamber 85 and the strength of the upper part 84 against the gas pressure will be ensured by the thickness thereof. The upper part 84 is provided with bosses 86 and 87 projecting leftwardly and rightwardly. Threaded female holes 86a and 87a are formed respectively in the bosses 86 and 87. The upper part 84 is inserted between the left and right side members 51a and 51b of the upper fork 51 and the shafts 64 and 64 in the form of bolts inserted in the bearing holes 88 and 89 formed respectively in the members 51a and 51b are threadedly engaged respectively in the threaded female holes 86a and 87a. Thus, the shock absorber 62 is connected at its upper end to the upper fork 51. Because this connection is made at the thick part of the damper 62a, a large connecting strength which can oppose large loads is obtained.

The shafts 64 and 64 are inserted respectively into the bearing holes 88 and 89. Respective rubber bushes 92 and 92 interposed between inner tubes 90 and 90 and outer tubes 91 and 91 are fitted on the outer peripheral surfaces of the shafts 64 and 64. Therefore, the shock absorber 62 is rubber-mounted to the upper fork 51 and the vibration is prevented from being transmitted from the shock absorber 62 to the upper fork 51 side.

Figure 8:
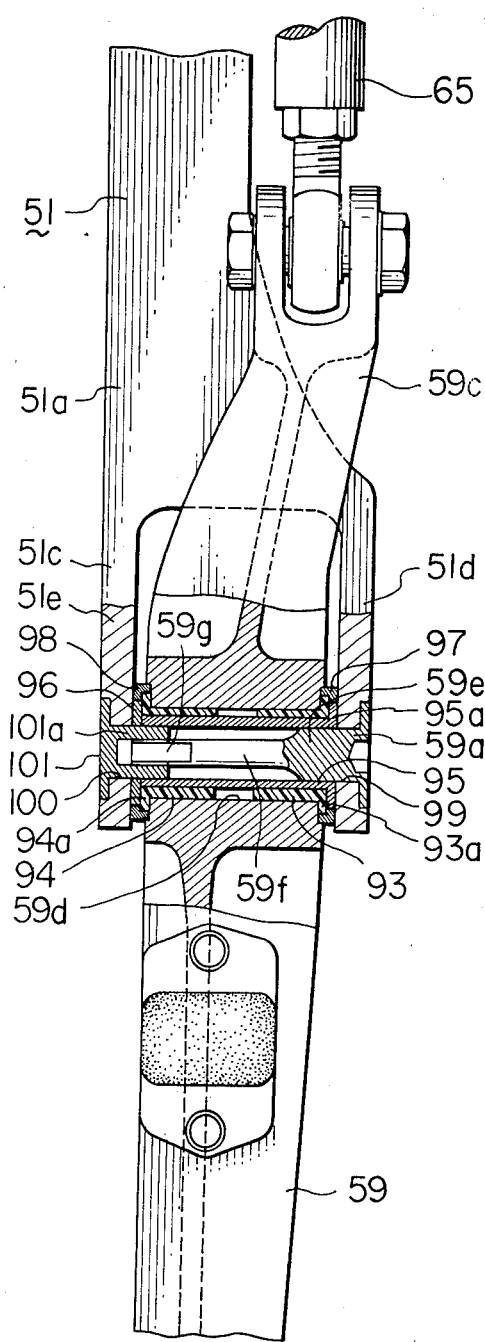
FIG. 8 is a sectioned view of an essential part, shown from the front, illustrating the connection of the upper fork and an arm on the front side.

To permit smooth deformation of the link mechanism 61, it is necessary that the connecting parts of the upper fork 51 and the two arms 59 and 60 should rotate smoothly without backlashes of the arms 59 and 60 with the fork 51, and further the connecting structure should be strong. Because the width of the arm 59 of the two arms 59 and 60 is relatively large, and moreover the lower end of the rod 65 connecting the link mechanism 61 to the shock absorber 62 is further connected to the tip 59c of the arm 59, the connecting part between the upper fork 51 and front side arm 59 which must be of a particularly strong structure is as shown in FIG. 8 in the form of a connecting structure of the left side member 51a of the upper fork 51.

The upper fork 51 has at the lower end thereof a forked part 51c comprising inner and outer projecting pieces 51e and 51d. A hole 59d passing in the right-and-left direction is formed through the arm 59 fitted in the forked part 51c and two oil-less bushes 93 and 94 made of a synthetic resin such as Teflon are pressed and fixed in the hole 59d from both right and left sides. Single-side flanges 93a and 94a are formed respectively on the bushes 93 and 94 and projected on both sides of the arm 59. A collar 95 made of a metal material is inserted into both of the bushes 93 and 94 and a single-side flange 95a is provided on collar 95 and extended on one side over the flange 93a of the bush 93. The outside diameter part of the collar 95 is finished to fit the inside diameter part of each of the bushes 93 and 94 so that the collar 95 can smoothly rotate and slide within each of the bushes 93 and 94 without backlashes. A washer 96 is provided on the end surface of the collar 95 on the side opposite the flange 95a so as to contact the outer surface of the flange 94a of the bush 94. Dust seals 97 and 98 are fitted to the outer peripheries of the single-side flanges 93a, 94a and 95a projecting out of both side surfaces of the arm 59 and the thrust washer 96 to prevent dust from entering between the sliding surfaces of the bush 94 and collar 95.

After the bushes 93 and 94 and the collar 95 are combined with the arm 59 as described above, the arm 59 is fitted in the forked part 51c of the upper fork 51. The shaft 59a is inserted through a hole 99 formed in the outer projecting piece 51d and is provided with a small diameter part 59f extending from the end of a large diameter base 59e. A male threaded portion 59g to be inserted into the collar 95 is formed on the small diameter part 59f. A nut 101 is inserted through a hole 100 provided in the inner projecting piece 51e of the forked part 51c and is provided with a tube part 101a within which a female threaded portion is formed. The tube part 101a is passed through the washer 96 and is inserted into the collar 95. The base 59e of the shaft 59a and the outside part of the tube part 101a of the nut 101 are both finished to be of the same size as the inside diameter part of the collar 95 and are set so as not to generate backlash.

When the male threaded portion 59g of the shaft 59a is threadedly engaged within the nut 101 and is fastened therein, the collar 95 will be pushed by the fastening force and will butt against the washer 96 with a thrust load, the positions in the axial direction of all members such as the bushes 93 and 94 and collar 95 will be determined, and the collar 95 will be supported at both ends by the large diameter part 59e of the shaft 59a and the tube part 101a of the nut 101, respectively. When the link mechanism 61 is deformed and the arm 59 rotates with respect to the upper fork 51, the collar 95 will rotate and slide with respect to the bushes 93 and 94 made of a synthetic resin and functioning as bearing members and, because the dimensions of the inside diameter of the bush 94 and the outside diameter of the collar 95 are accurately set, the collar 95 will slide without generating backlash even in the axial direction. This connecting structure is of a triple shaft type, i.e., the bushes 93 and 94, collar 95, and bolt 59a and nut 101. When the shaft 59a is fastened, the upper fork 51 and the arm 59 will be connected with each other in a strong manner.

The above-described connecting structure can also be applied to connect the upper fork 51 and the rear arm 60 with each other.

As shown in FIGS. 2 and 3, respective cushion members 102 formed of an elastic material such as rubber are fitted to front surfaces 59h of the front arms 59 so that, when the link mechanism 61 is completely yielded by the upward movement of the front wheel, the cushion members 102 will prevent the arms 59 and the lower fork 52 from directly contacting each other. The cushion members 102 may be fitted to respective upper surfaces 52i and 52j of the extensions 52c and 52d extending forwardly of the parts connecting the lower ends of the arms 59 of the lower fork 52 as shown in FIG. 1. It is sufficient that either set of the surfaces 59h, 59h or the surfaces 52i, 52j be provided with the cushion members 102, 102.

An antidiving mechanism for preventing the front part of the vehicle body from diving down when the motorcycle is braked during travel will be described hereinbelow with reference to FIGS. 9–11.

Figure 10:
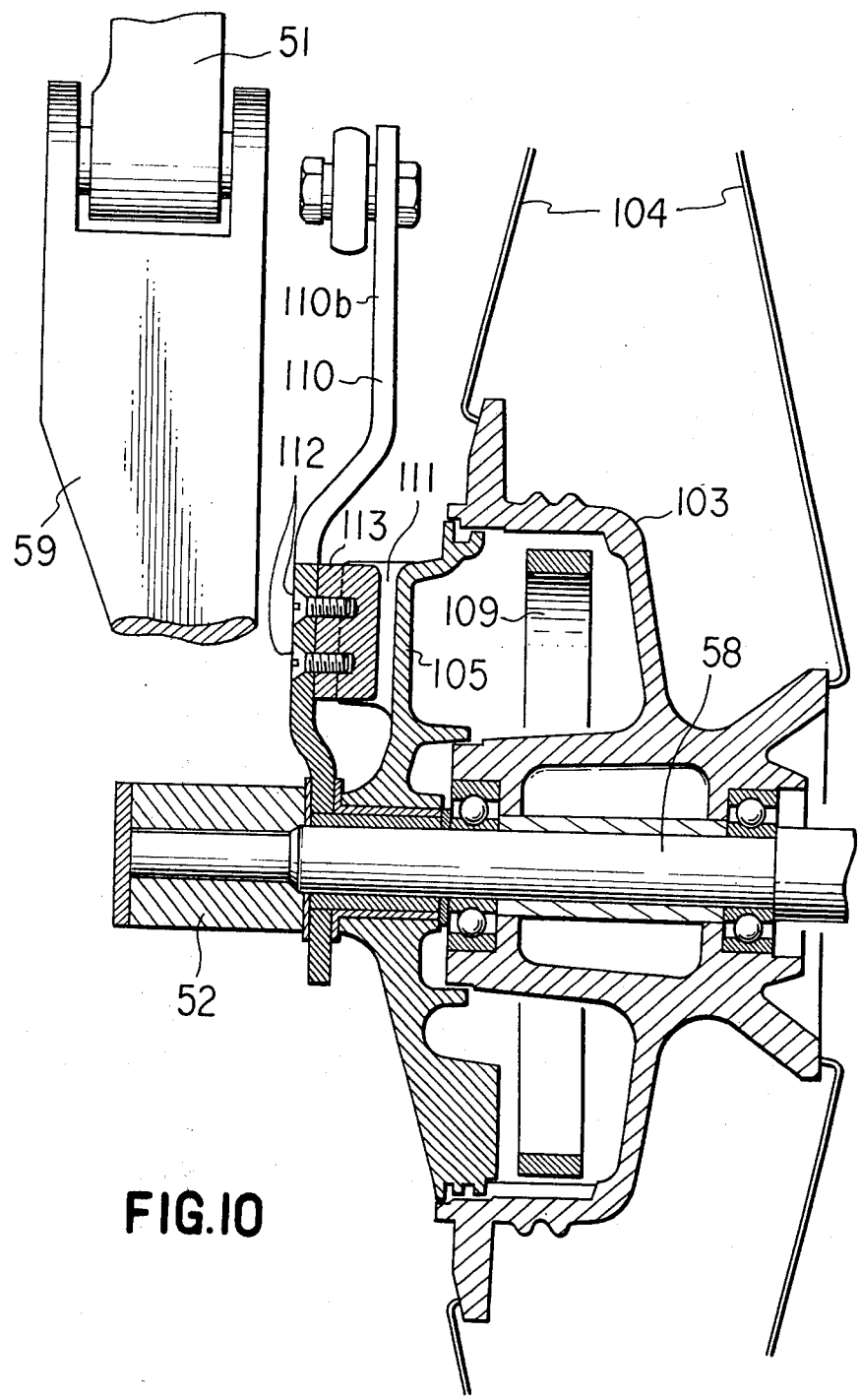
FIG. 10 is a sectioned view taken along line 10—10 in FIG. 9.
Figure 11:
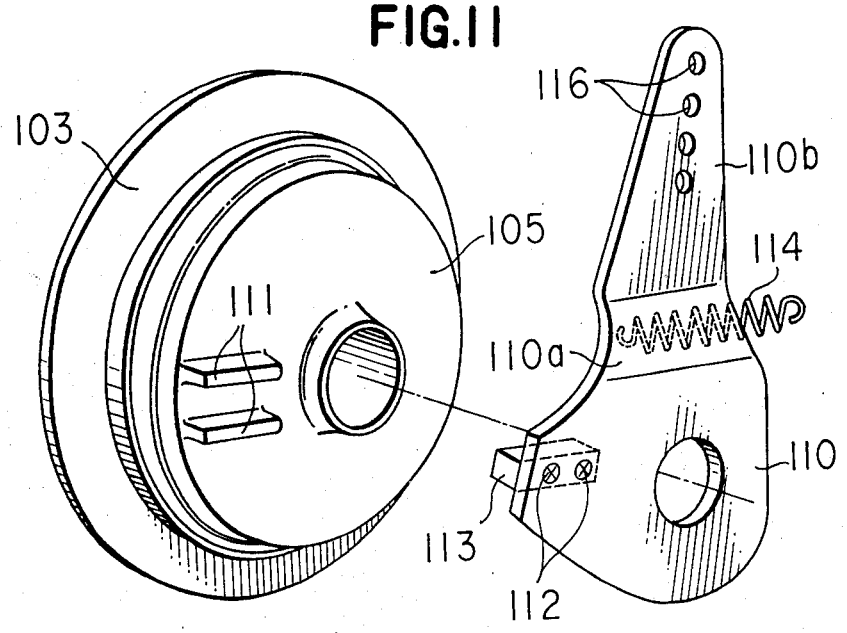
FIG. 11 is a view of a disassembled brake panel and a plate forming the antidiving mechanism.

As shown in FIG. 10, a brake drum 103 is arranged on the front wheel axle 58 and the front wheel 57 is connected to the drum 103 through spokes 104 so that the drum 103 rotates integrally with the front wheel. A brake panel 105 is provided on the axle 58 so as to close the open side of the drum 103. A brake arm 106 shown in FIG. 9 is rockably pivoted to panel 105 through a shaft 107 so that, when the brake lever is operated, the arm 106 will be rocked by a cable 108, brake shoes 109 (FIG. 10) will be expanded by a distal cam part of the shaft 107 disposed within the brake drum 103, and the braking will be effected by the pressing contact of the shoes 109 with the inner surface of the drum 103 in a known manner.

A plate 110 fixed to the outer surface of the brake panel 105 is provided on the axle 58. As shown in FIG. 11, two projections 111 projecting from the panel 105 are formed integrally and a projection 113 is secured to the inner surface of the plate 110 with screws 112 so that, when the projection 113 is fitted between the projections 111 and 111, the plate 110 will be fixed to the panel 105 and positioned in the peripheral direction. As shown in FIG. 11, an outwardly curved part 110a is formed in a part of the plate 110 and a return spring 114 of the brake arm 106 is housed within such curved part 110a and is protected by the plate 110. The spring 114 is engaged at one end with the arm 106 and at the other end with the panel 105 or the plate 110.

An upward extension 110b is formed integrally with the plate 110 thus fitted substantially integrally to the brake panel 105, and a rod 115 (FIG. 9) is arranged between extension 110b and one of the two front and rear arms forming the link mechanism 61 or, in the present embodiment, the front side arm 59. In the present embodiment, a plurality of holes 116 are formed at vertically spaced intervals in the extension 110b and the rod 115 is provided in the form of a turnbuckle type rod in which the length thereof can be adjusted by screwing threaded rods 115b and 115c at both ends of main rod 115a. One threaded rod 115b is connected to a specific one of the holes 116 through a bolt 117 and the other threaded rod 115c is connected to the arm 59 through a bolt 118 to connect the plate 110 and the arm 59 with each other through the rod 115.

When the motorcycle is braked by a brake operation during travel, the shoes 109 will press and contact the drum 103 and therefore the same forward rotary moment load as is present in the drum 103 will be developed in the plate 110. When the arm 59 is rotated counterclockwise by braking and the quadrilateral link mechanism 61 tends to be deformed, a tensile force will act on the rod 115. Therefore, the counterclockwise rotation of the arm 59 will be prevented, the deformation of the link mechanism 61 will be regulated, the diving of the front part of the vehicle body will be controlled and an antidiving function will be attained.

When the connecting part of the rod 115 to the plate 107 is varied by means of the hole 116, the angle of inclination of the rod 115 to the horizontal will vary and the antidiving characteristic is thereby adjustable.

A plurality of antidiving characteristic adjusting holes may be provided at vertically spaced intervals on the arm 59, such as holes 116a shown in dashed line in FIG. 9, or on both the plate 110 and arm 59.

When a motorcycle provided with a suspension system according to the present invention is to be employed for recreational activities such as sporting events, it will not always be desirable that the mechanical rigidity of the handlebar operation load transmitting system from the handlebar to the front wheel be great, but it will be desirable to have a proper rigidity and slenderness in consideration of the sporting conditions and rider technique. Therefore, in the present invention, as shown in FIGS. 12 and 13, a cross-member connecting the rear ends of right and left side members 152b and 152a forming a lower fork 152 is made removable so as to be replaceable.

Figure 12:
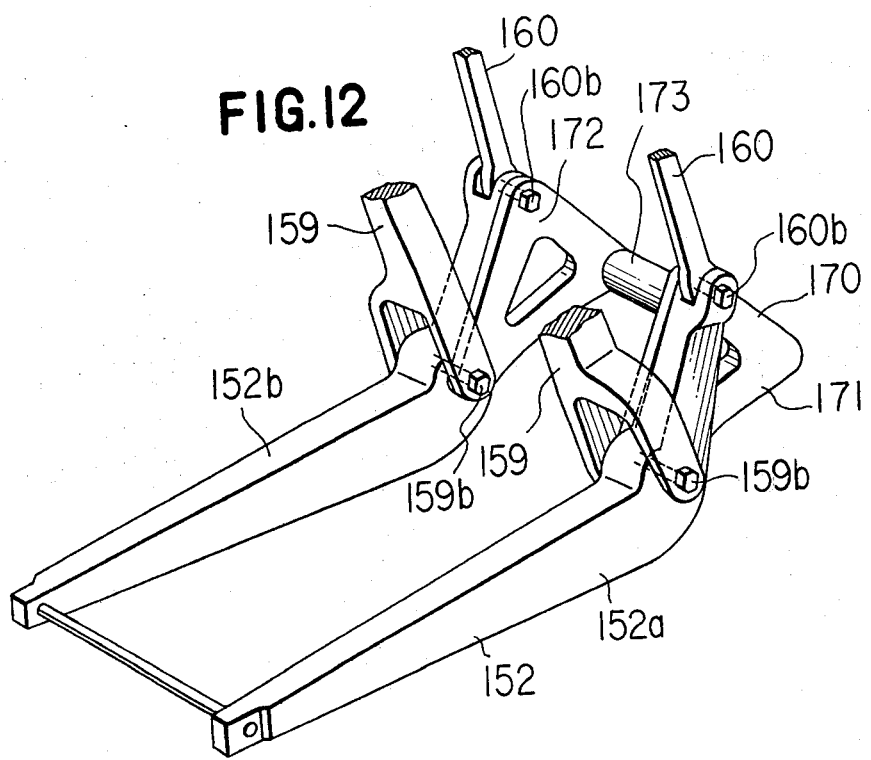
FIG. 12 is a perspective view showing an embodiment wherein a cross-member is removably connected to right and left side members of a lower fork.
Figure 13:
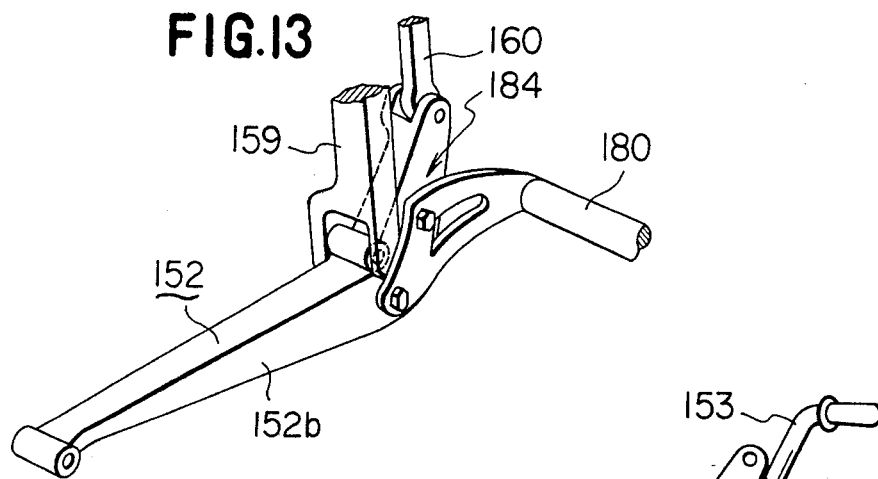
FIG. 13 is a perspective view showing a modification of the embodiment shown in FIG. 12.

A cross-member 170 shown in FIG. 12 is formed by connecting the rear corner parts of two triangular plates 171 and 172 with each other through a pipe 173. The respective plates 171 and 172 are connected to the inner surfaces of the side members 152a and 152b through shafts 159b and 160b connecting the lower ends of two arms 159 and 160 to the lower fork 152 on both sides therof. Such shafts 159b and 160b may be provided in the form of bolts, so that the cross-member 170 is removable. A plurality of cross-members of varying rigidity are provided. The rigidity is varied by varying the thicknesses of the plates 171 and 172 or by varying the diameter of the pipe 173. The respective connecting parts of the cross-member 170 for connecting parts of the arms 159 and 160 to the side members 152a and 152b, are formed with a large strength so as to effectively oppose a large load acting between the members 152a and 152b and the arms 159 and 160, and are therefore advantageous in that the connecting strength of the cross-member 170 can be high. Even when a cross-member 180 is connected as shown in FIG. 13 in a portion 184 around the connecting parts of the arms 159 and 160 to the side member 152b (the same as on the other side member 152a), because the strength of the portion 184 is high, the same advantage will be attained.

Figure 14:
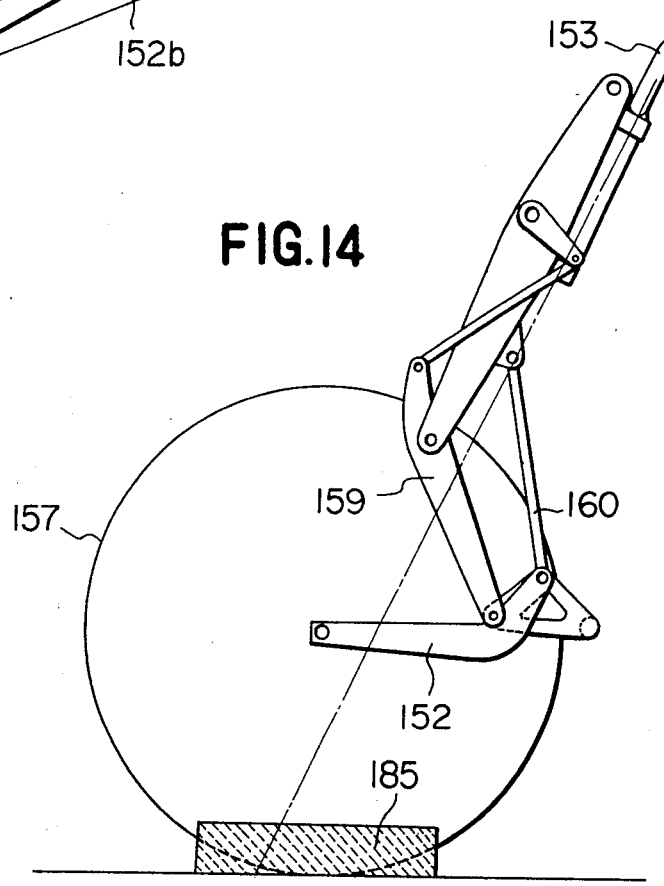
FIG. 14 is a side view for illustrating a method of determining the rigidity of a handlebar operating load transmitting system from a handlebar to a front wheel.
Figure 15:
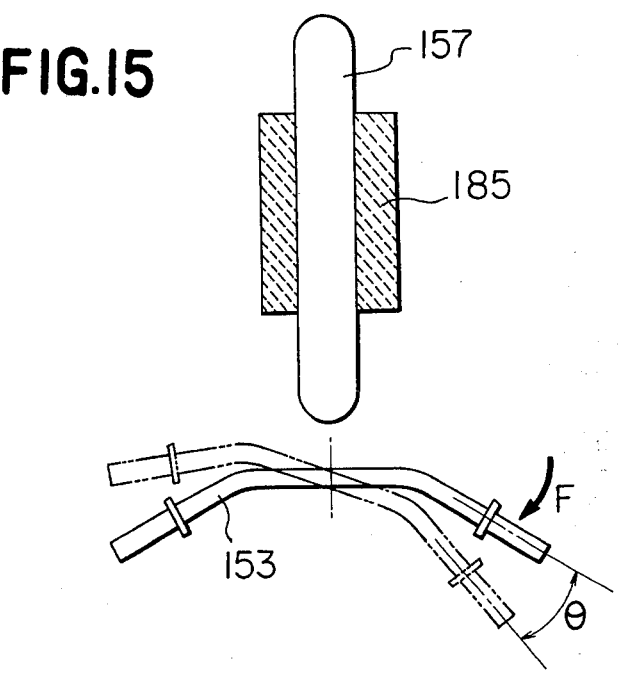
FIG. 15 is a plan view showing only an essential part of FIG. 14.
Figure 16:
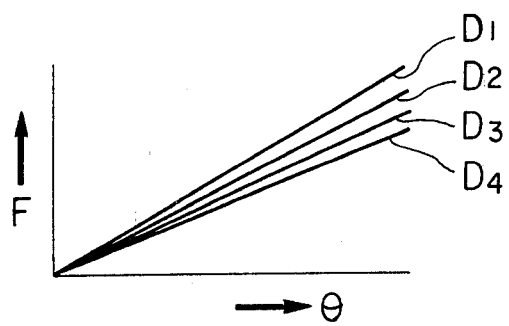
FIG. 16 is a graph showing the rigidity obtained from the method illustrated in FIGS. 14 and 15.

The mechanical rigidity of the handlebar operation load transmitting system from the handlebar to the front wheel can be determined by a method described with reference to FIGS. 14 and 15. A front wheel 157 is fixed by a block 185. The operation load F required to rotate a handlebar 153 by an angle $\theta$ may be determined as follows. $F/\theta$ indicates the level of rigidity. A plurality of cross-members of varying rigidity should be replaced one by one, and in one case no cross-member is used, and the handlebar operation load transmitting system may then be checked for characteristics represented by $D_1$, $D_2$, $D_3$ and $D_4$ in FIG. 16 and a rigidity suitable for the sporting conditions and rider technique can be selected.

Figure 17:
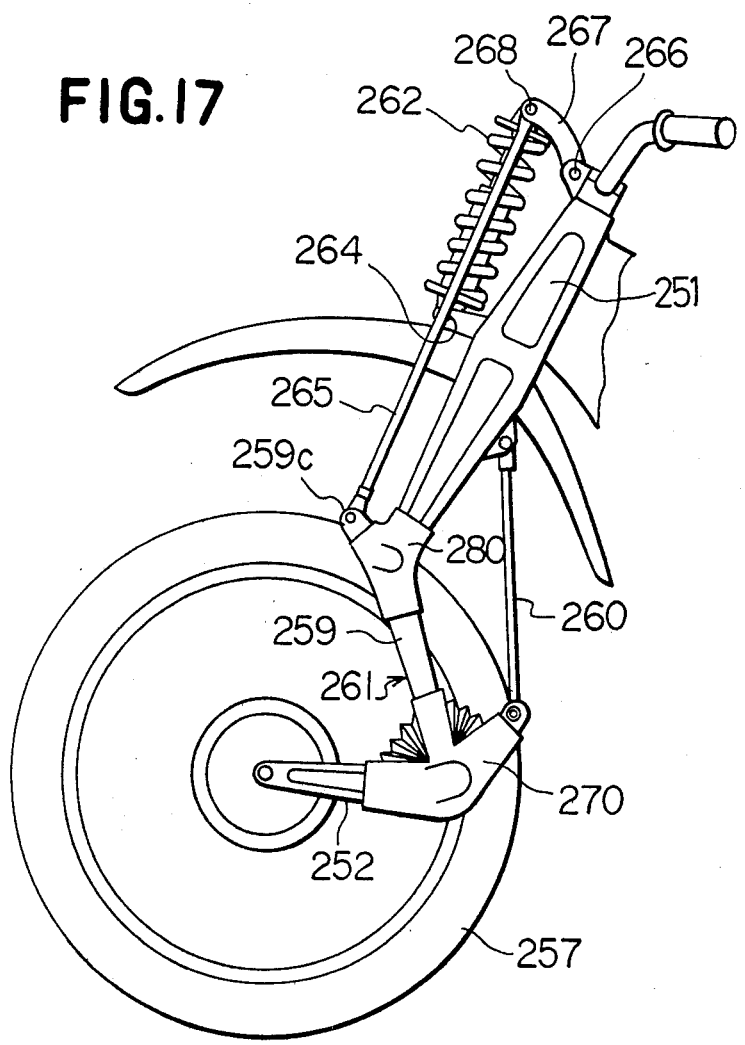
FIG. 17 is a side view showing an embodiment wherein a connecting part of both upper and lower forks and a front side arm is covered with a cover.

In a front wheel suspension system shown in FIG. 17, as in the embodiment shown in FIGS. 1, 2 and 3, a tip 259c extending upwardly above the connecting part to an upper fork 251 is formed on a front arm 259 of two arms 259 and 260 connecting the upper fork 251 and a lower fork 252 with each other, and the lower end of a rod 265 connecting a link mechanism 261 and a shock absorber 262 with each other is connected to tip 259c. In this embodiment, the lower end of the shock absorber 262 is connected to the upper fork 251 so as to be rockable forwardly and rearwardly through a shaft 264 and the upper end of the rod 265 is connected to the upper end of the shock absorber 262. Further, the front end of a lever 267 fitted at its rear end to be vertically rockable to the top of the upper fork 251 through a shaft 266 is connected to the upper end of the shock absorber 262 together with the upper end of the rod 265 through a shaft 268.

Even when the rod 265 and the shock absorber 262 are connected with each other as described above, when a front wheel 257 moves upwardly, the shock absorber 262 will be compressed in the same manner as in the embodiment shown in FIGS. 1, 2 and 3 by a downward tensile force acting on the rod 265 and the structure will be advantageous with respect to the strength of the rod as a load transmitting member.

In the embodiment shown in FIG. 17, the connecting parts of the upper and lower ends of the arm 259 and both forks 251 and 252 are covered with flexible covers 270 and 280. The covers 270 and 280 protect the pivotal connecting parts of the arms 259 and both forks 251 and 252 from mud and springing stones. Each of the covers 270 and 280 is molded of a deformable material such as rubber, synthetic resin, or the like.

Figure 18:
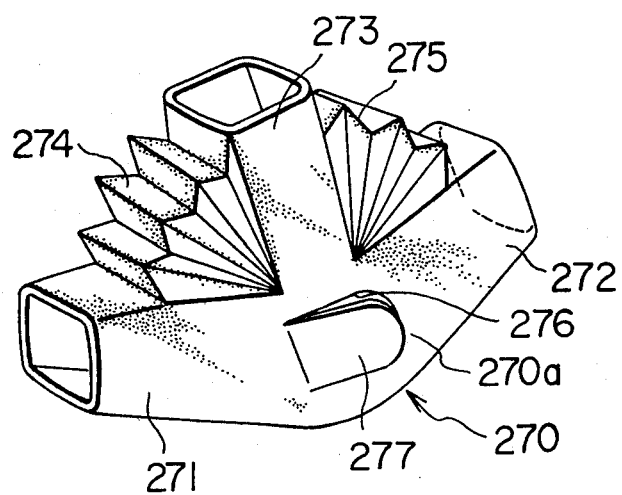
FIGS. 18 and 19 are perspective views of the covers shown in FIG. 17.

As shown in FIG. 18, the cover 270 for covering the connecting part of the lower fork 252 and the lower end of the arm 259 comprises three respectively forwardly, rearwardly and upwardly extending tube parts 271, 272 and 273 and the bases of such tube parts 271, 272 and 273 are connected together. The lower fork 252 is inserted in the front tube part 271 and rear tube part 272 and the lower part of the arm 259 is inserted in the upper tube part 273. Flexible bellows 274 and 275 are provided respectively between the front tube part 271 and upper tube part 273 and between the rear tube part 272 and upper tube part 273. Further, a window hole 276 is opened on a side surface 270a of the cover 270 corresponding to the connecting part of the arm 259 and lower fork 252 so that the assembly work of connecting the arm 259 and lower fork 252 can be made through window hole 276. The window hole 276 is opened and closed by means of a lid 277 which is formed by leaving a part uncut when cutting off the side surface 270a to form the window hole 276.

Figure 19:
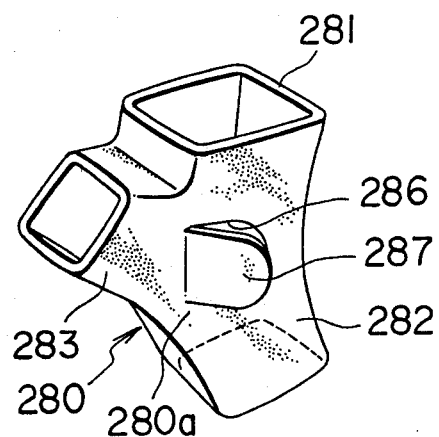

The cover 280 covering the connecting part of the upper end of the arm 259 and upper fork 251 comprises three respectively upwardly, downwardly and forwardly extending tube parts 281, 282 and 283 as shown in FIG. 19. The lower part of the upper fork 251 is inserted in the upper tube part 281. The upper part of the arm 259 including the tip 259c is inserted in the lower tube part 282 and front tube part 283. As in cover 270, in cover 280 a window hole 286 to be opened and closed by means of a lid 287 is formed on a side surface 280a.

It is also contemplated that the connecting parts of the rear arms 260 and both forks 251 and 252 may be covered with the same flexible covers as described hereinabove.

Figure 20:
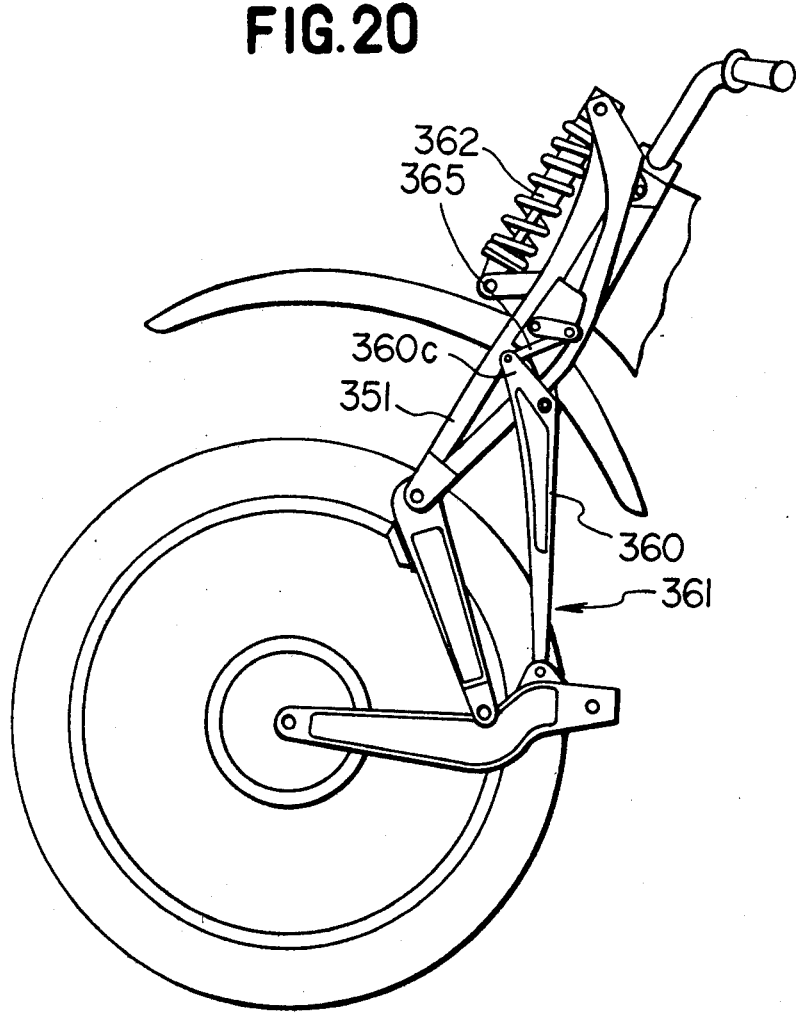
FIG. 20 is a side view showing a suspension system wherein the lower end of a rod is connected to the tip of an arm.

The lower end of a rod is connected to an extended tip of a front arm forming a link mechanism in each of the above-described embodiments. However, as shown in FIG. 20, a tip 360c extending upwardly over the connecting part with an upper fork 351 may be formed on a rear side arm 360. The lower end of a rod 365 connecting a link mechanism 361 and a shock absorber 362 with each other may be connected to tip 360c. In the present embodiment, too, the rod 365 serves as a tension rod. Further, in the present embodiment, in order to reduce the weight, the upper fork 351 may be formed of a pipe material.

When a motorcycle is used for sporting events, it is generally required to attach an identification plate to the motorcycle. Various embodiments of an identification plate will be described in the following.

Figure 21:
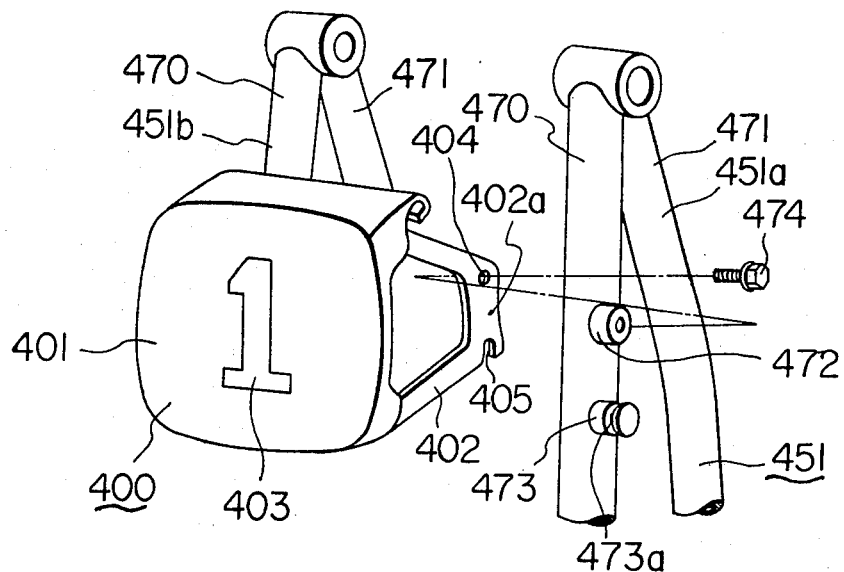
FIG. 21 is a perspective view showing an embodiment wherein an identification plate is fitted to an upper fork.

As shown in FIG. 21, an identification plate 400 comprises a front indicating member 401 and two fitting stay members 402 extending rearwardly from the indicating member 401. A number 403 is indicated on the front surface of the indicating member 401. A hole 404 is formed in the upper part of a base 402a of each stay member 402 and a downwardly opened groove-shaped hook part 405 is formed in the lower part of each member 402. Side members 451b and 451a on the right and left of an upper fork 451 are formed of respective combinations of front and rear pipes 470 and 471. A nut 472 and a pin 473 are secured above and below by welding or the like to the outside surface of the front pipe 470. An annular groove 473a is formed on the pin 473. The hook part 405 is engaged with this groove 473a, a bolt 474 is inserted in the hole 404 and the nut 472 is threadedly engaged and fastened so that the identification plate 400 is fitted to the upper fork 451 and projected from the front surface of the upper fork 451. Therefore, the identification plate 400 can be fitted with the bolt 474 for each of the side members 451a and 451b and can be removed by only removing the bolt 474. If the motorcycle is provided with devices such as a front wheel shock absorber arranged at the rear of the identification plate 400, the maintenance procedures for the shock absorber can be performed easily and quickly.

Figure 22:
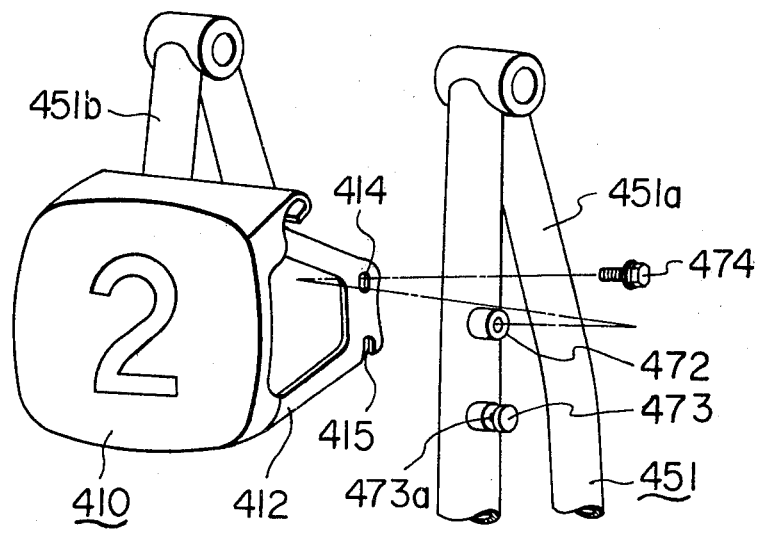
FIG. 22 is a perspective view showing a modification of the embodiment shown in FIG. 21.
Figure 23:
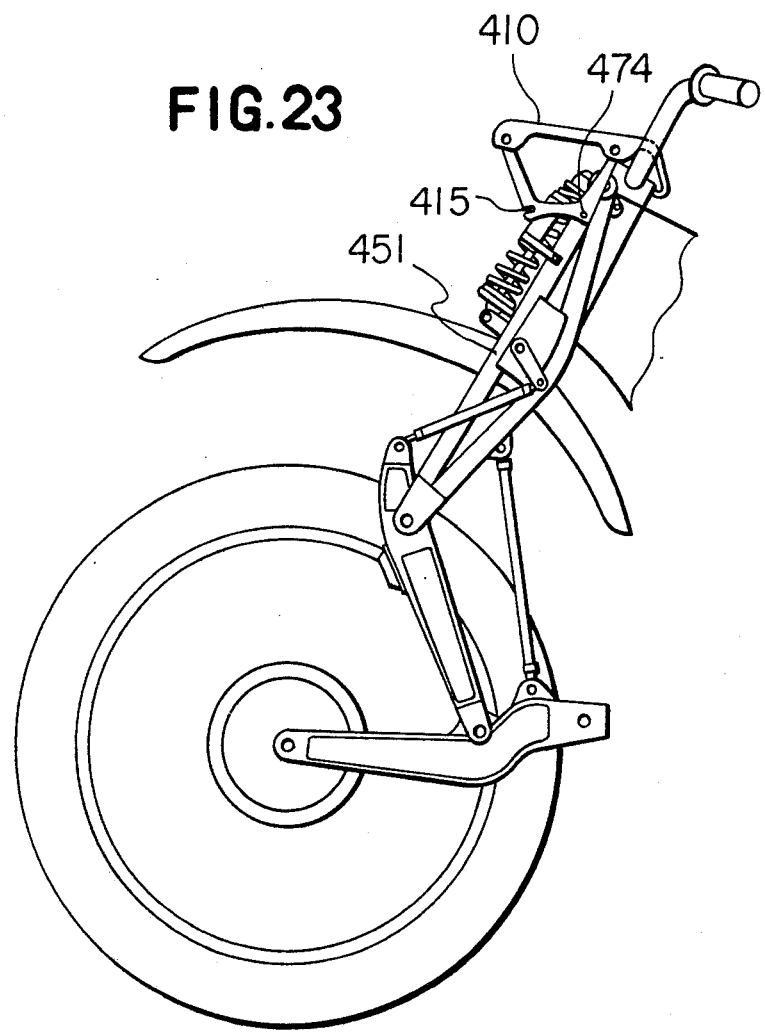
FIG. 23 is a side view showing the identification plate depicted in FIG. 22 in an upwardly rotated position.

As shown in FIG. 22, a hole 414 formed on a fitting stay 412 provided at each lateral side of an identification plate 410 comprises a slot which is substantially elongated in the vertical direction. Because the hole 414 through which the bolt 474 is inserted is elongated, the hook part 415 can be disengaged from the groove 473a of the pin 473 by merely loosening the bolt 474 without removing it from the nut 472 and by only lifting the identification plate 410. Therefore, the identification plate 410 can be rotated upwardly with the bolt 474 as a center as shown in FIG. 23, and maintenance of devices arranged at the rear of the identification plate 410 is further facilitated.

Figure 24:
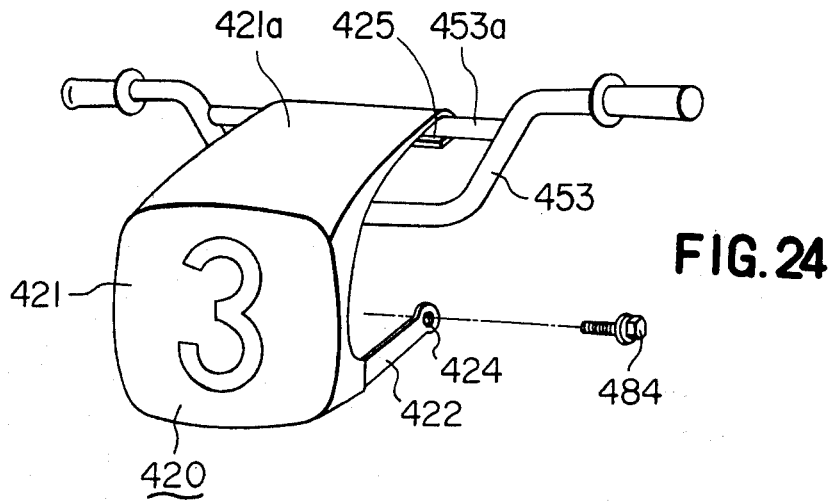
FIG. 24 is a perspective view showing still another modification of the embodiment shown in FIG. 21.

With reference to FIG. 24, the upper part of an indicating member 421 of an identification plate 420 has a rearward extension 421a. The rear end of extension 421a includes a downwardly curled hook part 425. A fitting stay member 422 extends rearwardly from the lower part of the indicating member 421 on each lateral side thereof. A hole 424 is formed at the rear end of each stay member 422, so as to be vertically spaced from the hook part 425. A handlebar 453 is made integral with the upper fork in the same manner as the pin 473 in FIGS. 21 and 22. A cross-member 453a is arranged in the rightward-and-leftward direction on handlebar 453. The hook part 425 is engaged with the cross-member 453a and a a bolt 484 inserted in the hole 424 is threadedly fastened to the upper fork to fit the identification plate 420 to the front surface of the upper fork. When performing a maintenance operation of devices arranged at the rear of the identification plate 420, the bolt 484 is removed and the identification plate 420 is rotated upwardly with the hook part 425 as a center. Therefore, as in the case of the embodiment shown in FIG. 22, such maintenance can be performed without removing the identification plate 420 from the upper fork.

Because the position of the identification plate fitted to the front surface of the upper fork is the same position at which a headlight device is normally arranged, when fitting the identification plate to the upper fork, the problem of the relative position thereof with respect to the headlight device must be solved. Means for solving such problem is shown in FIGS. 25 and 26.

Figure 25:
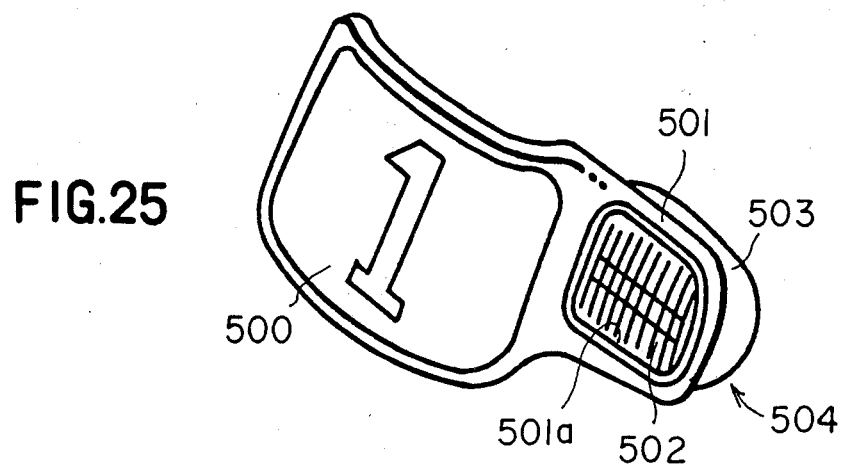
FIG. 25 is a perspective view showing an embodiment wherein a headlight device is integrally combined with an identification plate.

In FIG. 25, an identification plate 500 is provided with a sideward extension 501 in the form of a frame opened inside. A headlight lens 502 is fitted in the opening 501a. Further, a case 503 containing the headlight and other electrical devices is attached to the rear surface of the extension 501. Therefore, the identification plate 500 and the headlight device 504 are formed as a combined integral unit, the operation of fitting the identification plate 500 to the upper fork includes the operation of fitting the headlight device 504, and the identification plate 500 and the device 504 are fitted without interfering with each other.

Figure 26:
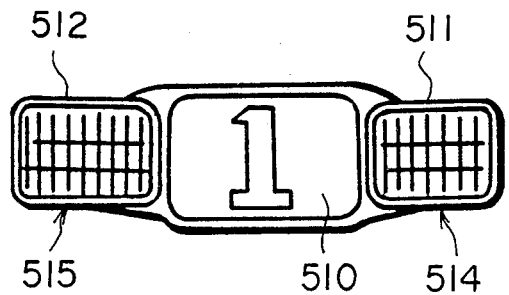
FIG. 26 is an elevational view showing a modification of the embodiment shown in FIG. 25.

An identification plate 510 shown in FIG. 26 is provided with extensions 512 and 511 on the right and left. Therefore, two headlight devices 514 and 515 may be integrally combined with the identification plate 510.

Figure 27:
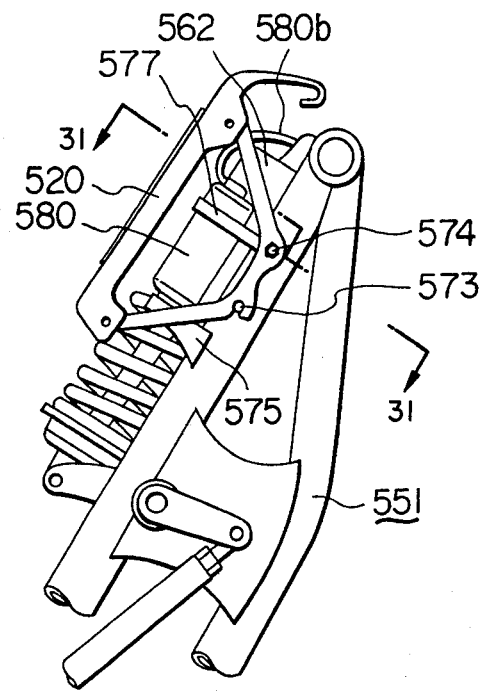
FIG. 27 is a side view showing an embodiment wherein a shock absorber and a sub-tank are arranged between an identification plate and an upper fork.

FIG. 27 shows an embodiment wherein a front wheel shock absorber 562 and a sub-tank 580 for feeding a shock absorbing medium to a damper of shock absorber 562 are arranged between an identification plate 520 and an upper fork 551.

Figure 28:
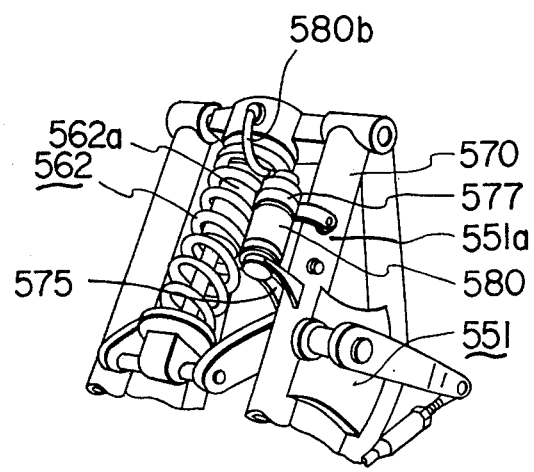
FIG. 28 is a perspective view of FIG. 27, with the identification plate removed.

In FIG. 28, the FIG. 27 structure is shown with the identification plate 520 removed. The sub-tank 580 is fitted to a side member 551a forming the upper fork 551. This fitting method may be carried out as shown in FIG. 29. A forwardly extending stay 575 is secured to a front pipe 570 forming side member 551a and a cup part 575a at the tip of the stay 575 is crowned with a ring-shaped receiving seat member 576 made of an elastic material. A projection 580a projecting out of the lower surface of the tank 580 and serving as a pressure adjusting part is fitted into the receiving seat member 576 and a band 577 is positioned around the outer periphery of the tank 580. Holes 577a and 577b are formed at both ends of the band 577. A bolt 574 is inserted into the holes 577a and 577b and is threadedly fastened to a nut 572 secured to the front pipe 570. Thus, the tank 580 is fitted to the upper fork 551 on the side of the shock absorber 562. The nut 572 corresponds to the nut 472 shown in FIGS. 21 and 22 and comprises a member for fitting the identification plate 520 to the upper fork 551 in cooperation with a pin 573. Therefore, the tank 580 can be fitted by a member in common with the identification plate 520.

The sub-tank 580 and a damper 562a of the shock absorber 562 are connected with each other through a tube 580b. The tank 580 functions to substantially increase the capacity of the damper 562a which is limited in capacity. The tank 580 is arranged on the side of the shock absorber 562 as described above by utilizing a dead space and the length of the tube 580b can thus be reduced.

With reference to FIG. 30, a front surface 520a of the identification plate 520 is formed to have a metal-screen configuration provided with a multiplicity of ventilating holes 520b. Therefore, while the motorcycle is travelling, wind will pass through ventilating holes 520b so as to contact the shock absorber 562 and sub-tank 580 arranged at the rear of the identification plate 520. When the shock absorbing medium contained in the damper 562a of the shock absorber 562 is a gas, compression of the shock absorber will cause the damper 562a and tank 580 to generate heat. Such generated heat can be cooled by the aforesaid wind passing through the ventilating holes 520b.

Figure 31:
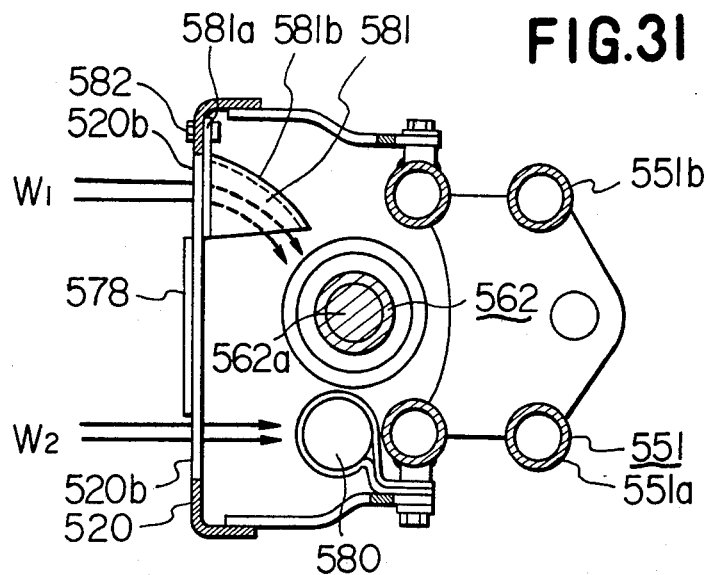
FIG. 31 is a sectioned view taken along line 31—31 in FIG. 27.

When a number indicating plate 578 having a wind shielding effect is fitted to the front surface 520a of the identification plate 520, because the shock absorber 562 is positioned just behind the indicating plate 578, the aforesaid cooling effect by the wind will be impaired. A wind guiding member 581 is employed to solve this problem. A front edge flange part 581a of wind guiding member 581 is fitted with screws 582 to the back surface of the identification plate 520 in the side part of the indicating plate 578 as shown in FIG. 31. The side surface 581b of the wind guiding member 581 is curved inwardly of the identification plate 520 from the front part to the rear part. Therefore, a wind $W_1$ having passed through the ventilating holes 520b on the side of the indicating plate 578 will be guided toward the shock absorber 562 by the wind guiding member 581 and the effect of air-cooling the shock absorber 562 will be improved. A wind $W_2$ having passed through the ventilating holes 520b on the side of the indicating plate 578 on the opposite side of the wind guiding member 581 will directly hit the sub-tank 580.

Figure 32:
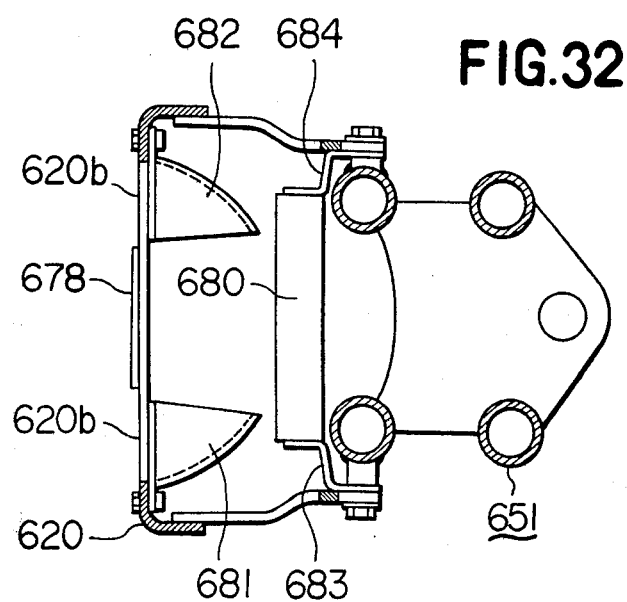
FIG. 32 is a sectioned plan view showing an embodiment wherein a radiator is arranged between an identification plate and an upper fork.

In addition to the shock absorber, any device which radiates heat may be arranged between the identification plate provided with the ventilating holes as described above and the upper fork. FIG. 32 shows an example of such a heat radiating device, which may comprise a radiator if the engine of the motorcycle is of a water-cooled type.

A radiator 680 is fitted to the front surface of an upper fork 651 through stays 683 and 684. Two wind guiding members 681 and 682 symmetrically disposed on the right and left are fitted to the back surface of an identification plate 620 on both sides of the indicating plate 678 so that the wind, having passed through ventilating holes 620b, will be guided toward the radiator 680.

In each of the embodiments shown in FIGS. 31 and 32, the wind guiding member may be formed integrally with the identification plate if desired.

Various embodiments wherein a progressive link mechanism forming a load transmitting course together with a rod is interposed between a link mechanism forming a quadrilateral on the side and a shock absorber will be described hereinbelow with reference to FIGS. 33-36. In these embodiments, the side-quadrilateral link mechanism is defined as a first link mechanism and the progressive link mechanism is defined as a second link mechanism. A displacement at the side of the end part of the first link mechanism as an input of the second link mechanism due to a deformation of the first link mechanism becomes a progressively expanded displacement of the shock absorber at the side of the end part of the shock absorber as an output of the second link mechanism.

Figure 33:
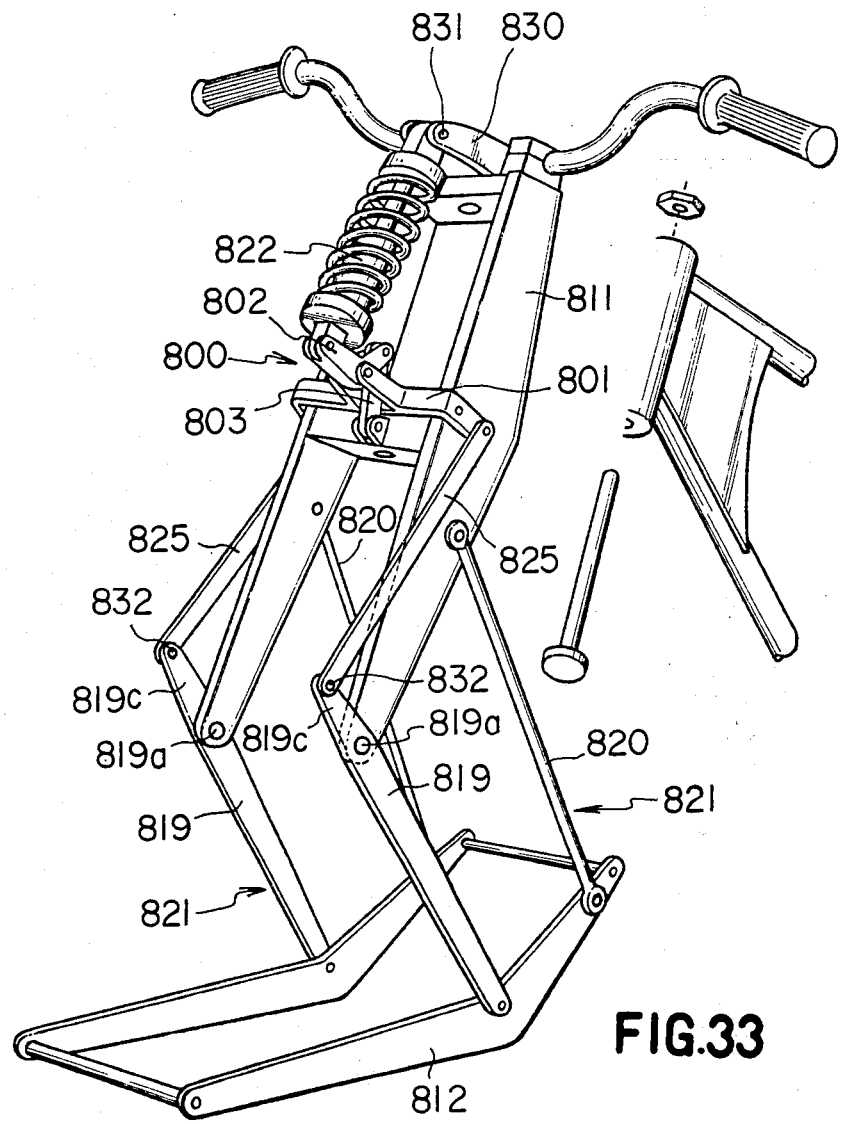
FIG. 33 is a perspective view of a suspension system according to an embodiment of the invention wherein a progressive link mechanism together with a rod is interposed between a link mechanism forming a quadrilateral on the side and a shock absorber.
Figure 34:
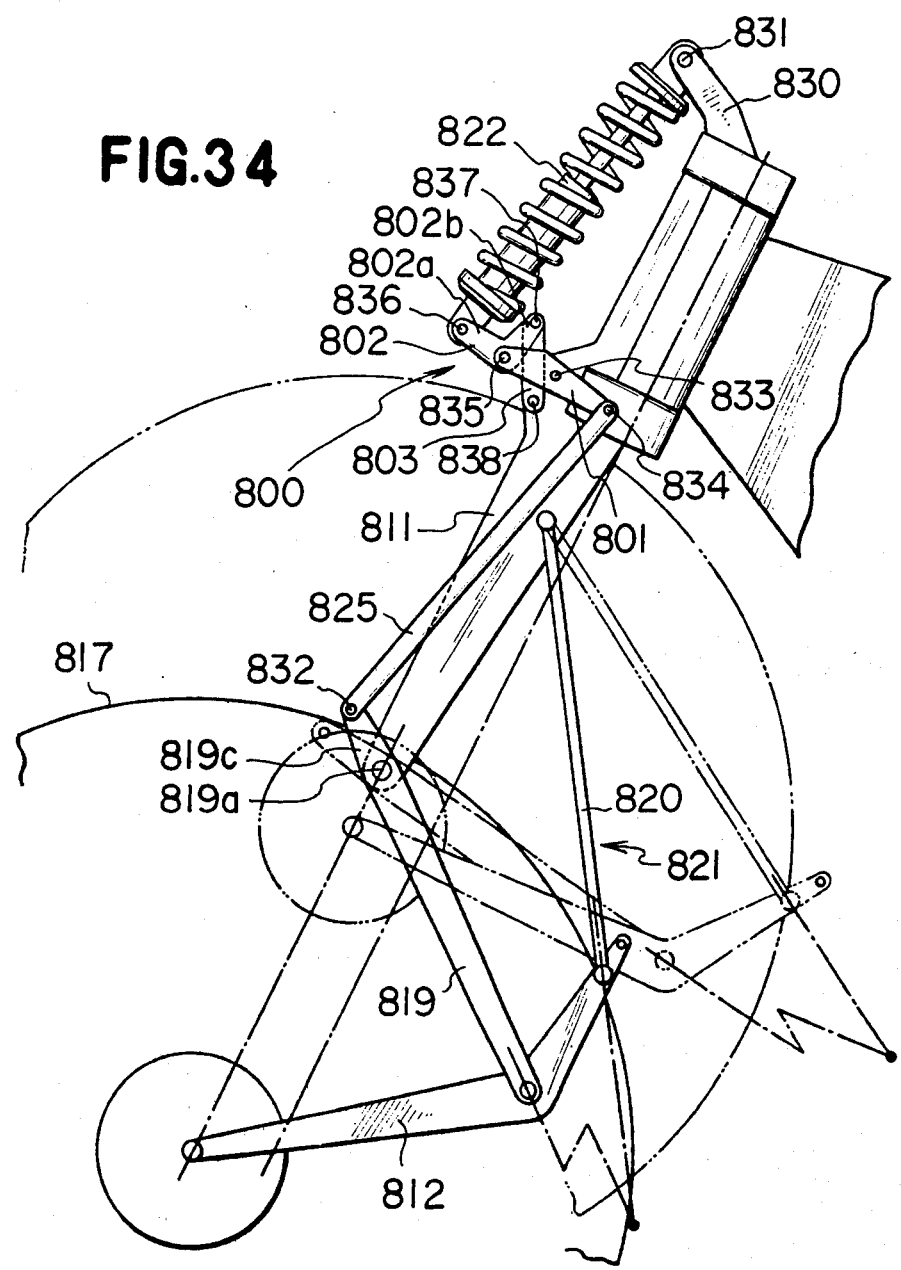
FIG. 34 is a side view of FIG. 33.

A second link mechanism 800 shown in FIGS. 33 and 34 is arranged between both upper ends of right and left rods 825 and a shock absorber 822. The upper end of the shock absorber 822 is connected so as to be forwardly and rearwardly rockable through a shaft 831 to the tip of a fixed arm 830 provided at the top of an upper fork 811. A tip 819c extended upwardly over a connecting part 819a connecting the upper fork 811 to a front side arm 819 in this embodiment is formed on each lateral side integrally on each one of two front and rear arms 819 and 820 which comprise movable links of a first link mechanism 821 together with a lower fork 812. Each lower end of the rods 825 and 825 is rotatably connected to the tip 819c through a shaft 832. The second link mechanism 800 comprises a first link 801, a second link 802 and a third link 803.

The intermediate part in the forward-and-rearward direction of the first link 801 is connected so as to be vertically rotatable to the upper fork 811 through a shaft 833 (FIG. 34) and the forked rear end of the first link 801 is connected to each upper end of the right and left rods 825 and 825 through a shaft 834. The second link 802 is bent into a substantially open V-shape comprising a forward extension 802a and an upward extension 802b. The front end of the first link 801 is connected to the bent part of the second link 802 through a shaft 835, and the forward extension 802a is connected to the lower end of the shock absorber 822 through a shaft 836. The upper and lower ends of the third link 803 are connected respectively to the upward extension 802b of the second link 802 and the upper fork 811 through shafts 837 and 838. The third link 803 vertically crosses the second link 802 to connect the upward extension 802b and upper fork 811 with each other.

In the above-described structure, the first link mechanism 821 forming a quadrilateral on the side and the shock absorber 822 are connected with each other through the second link mechanism 800 serving as a load transmitting means and the rod 825.

When a front wheel 817 moves upwardly, the arm 819 will rotate counterclockwise in FIG. 34 with the connecting part 819a as a center and therefore the first link 801 will be rotated clockwise with the shaft 833 as a center by a downward tensile load acting on the rod 825. By such rotation, the second link 802 will be moved upwardly and the shock absorber 822 will be compressed. With the upward extension 802b of the second link 802 being restrained by the upper fork 811 via the third link 803, the third link 803 will be rotated clockwise with the shaft 838 as a center and therefore the second link 802 will be rotated clockwise with the shaft 835 as a center with the upward movement. Therefore, the compression of the shock absorber 822 will have the clockwise rotation of the second link 802 added thereto and will progressively expand with the upward movement of the front wheel 817. In this manner, the shock absorbing force of the shock absorber 822 with the movement of the front wheel will have a progressive characteristic.

The connecting part of the end part on the first link mechanism 821 side of the second link mechanism 800, or in this embodiment the first link 801 connected to the rod 825, comprises an input end of the second link mechanism 800; and the connecting part of the shock absorber 822 side end part, or in this embodiment the second link 802 connected to the shock absorber 822, comprises an output end thereof. The second link mechanism 800 thus comprises a progressive link mechanism wherein a displacement of the input end provides a progressively expanded displacement at the output end.

Figure 37:
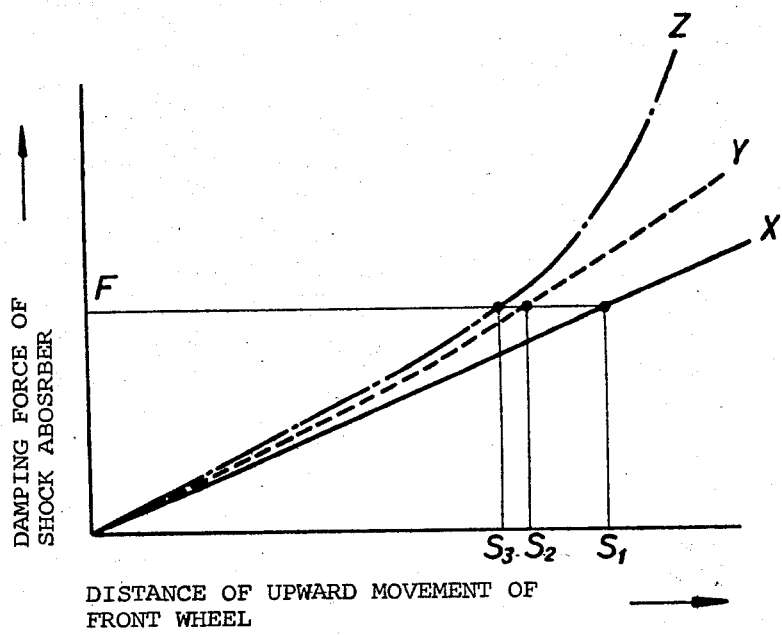
FIG. 37 is a graph comparing a telescopic-type suspension system with a suspension system including a progressive link mechanism with respect to the shock absorbing force of the shock absorber.

FIG. 37 illustrates a graph in which the abscissa represents the upward movement stroke of a front wheel and the ordinate represents the shock absorbing force of a shock absorber. Line X represents a characteristic of a conventional telescopic-type front wheel suspension system. As shown by line X, the shock absorbing force of the shock absorber is only proportional to the upward movement stroke of the front wheel. However, when a progressive link mechanism is provided, as shown by lines Y or Z, the shock absorbing force can be generated in a shock absorber at a rate higher than the rate of increase of the upward movement stroke of a front wheel and the shock absorbing force characteristic is a secondary curve characteristic. The characteristic of lines Y or Z can be set by varying the shapes and sizes of the first, second and third links. Further, the characteristic of lines Y or Z can be selectively set to be higher or lower by varying the leverage of the progressive link mechanism.

In order to generate a shock absorbing force F, for line X representing the conventional system, the front wheel must be moved upwardly by a stroke $S_1$, but for lines Y or Z, it may be moved upwardly by a stroke $S_2$ or $S_3$. Thereby, the property of the front wheel in following the road surface is improved, the height of a driver's seat can be reduced by a decrease of the stroke required to generate the same shock absorbing force, the center of gravity of the vehicle body can be lowered, and the diving of the front part of the motorcycle while braking can be reduced.

Figure 35:
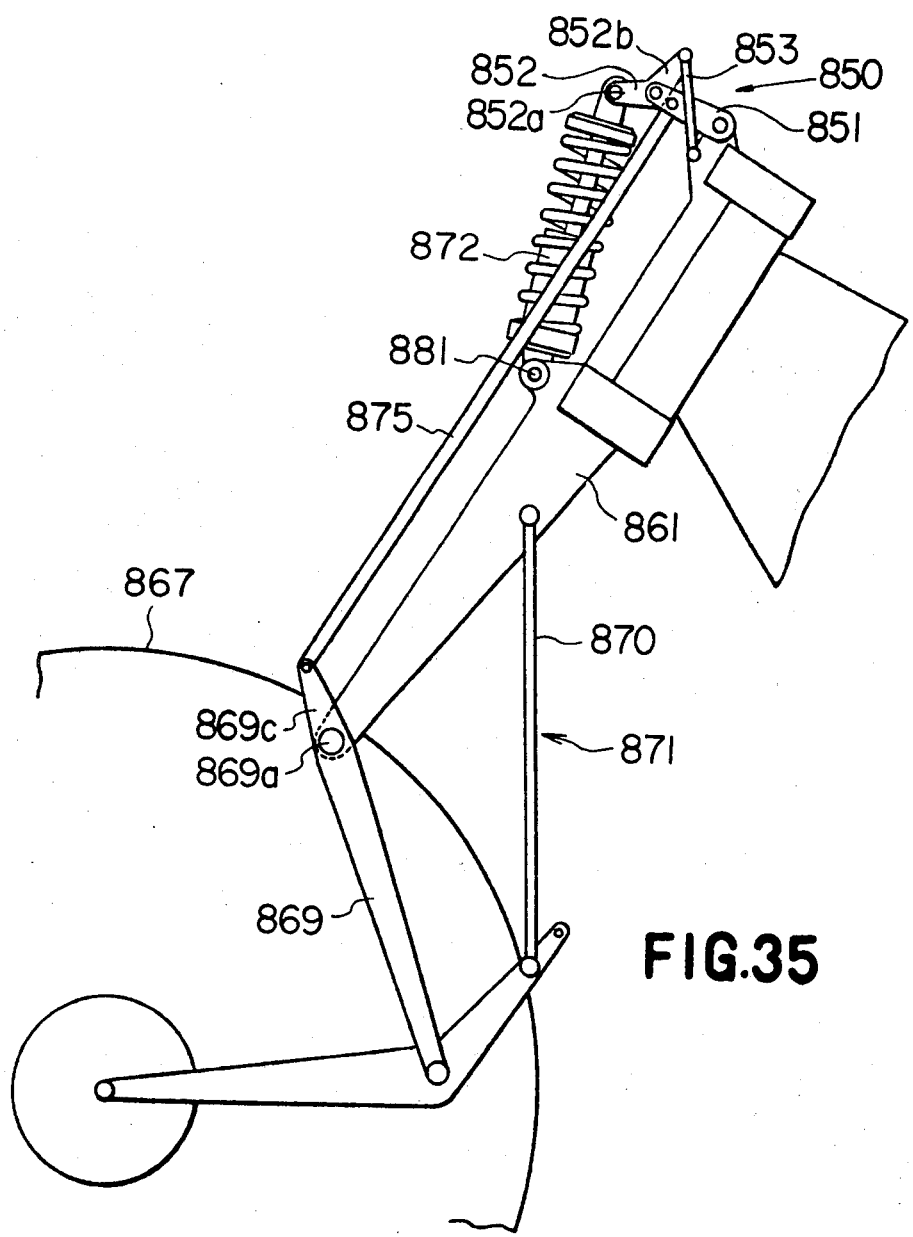
FIG. 35 is a side view showing a modification of the embodiment depicted in FIG. 34.

A second link mechanism 850 shown in FIG. 35 is arranged between the upper end of a rod 875 and the upper end of a shock absorber 872. The lower end of the shock absorber 872 is connected to an upper fork 861 through a shaft 881. A tip 869c extending upwardly over a connecting part 869a with the upper fork 861 is formed on a front arm 869 forming a first link mechanism 871 and the lower end of the rod 875 is connected to this tip 869c. By forming a tip similar to the tip 869c on a rear arm 870, the rod 875 may be connected to such tip of the rear arm 870. The second link mechanism 850 comprises a first link 851, a second link 852 and a third link 853. The first link 851 is connected so as to be vertically rotatable at its rear end to the top of the upper fork 861 and the upper end of the rod 875 is connected to an intermediate portion of the first link 851. This connecting part may be in the intermediate part in the forward-and-rearward direction of the first link 851 or at the front end thereof. The second link 852 is bent and formed into a V-shape on the side and includes a forward extension 852a and an upward extension 852b. The front end of the first link 851 is connected to the bent part of second link 852, and the forward extension 852a is connected to the upper end of the shock absorber 872. The third link 853 vertically crossing the first link 851 connects the upper extension 852b of the second link 852 and the upper fork 861 with each other.

Because the deformation of the first link 871 accompanying the upward movement of a front wheel 867 becomes a downward tensile load of the rod 875, the second link 852 will be pulled down by the counterclockwise rotation of the first link 851. Because the second link 852 itself is also rotated counterclockwise by the third link 853 with such pulling down movement, the shock absorbing force of the shock absorber 872 will have a progressive characteristic.

Figure 36:
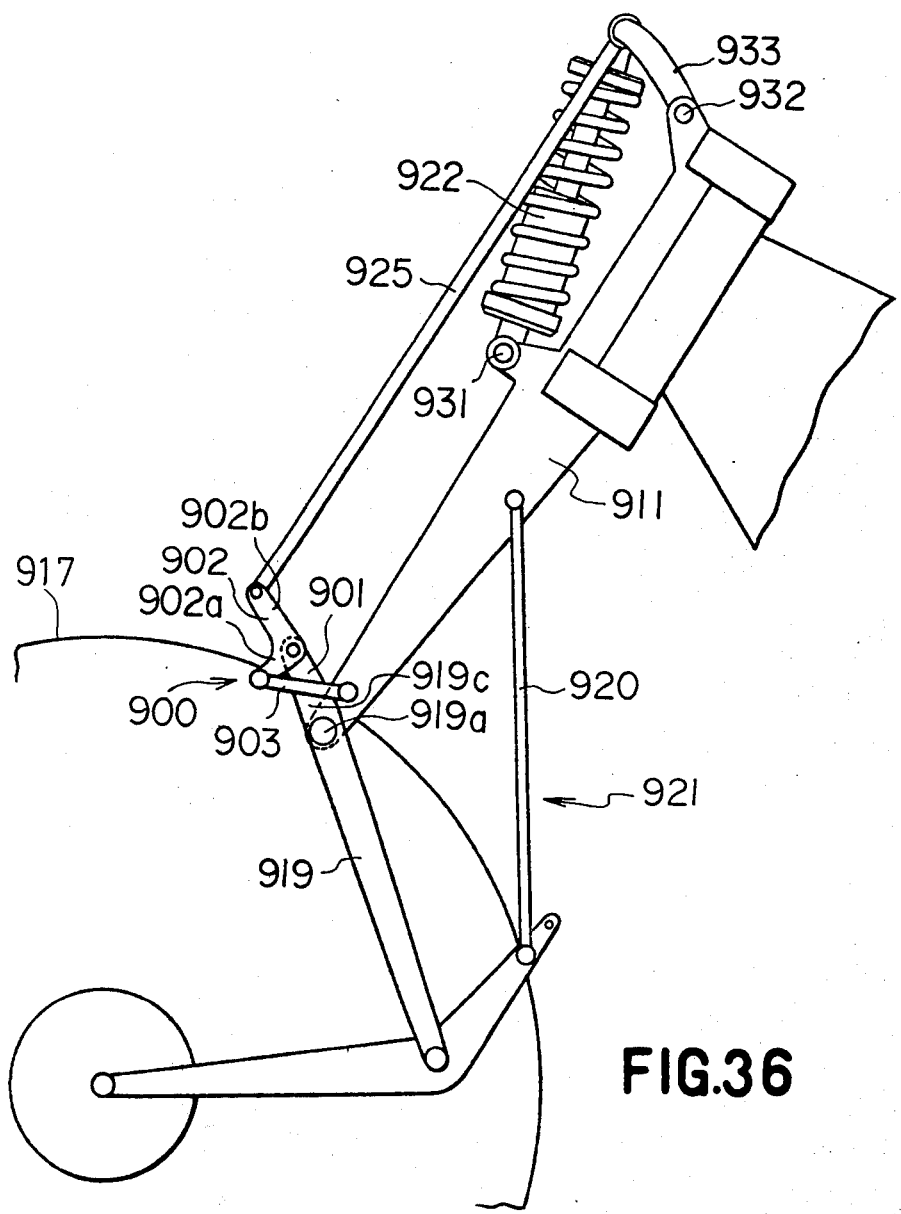
FIG. 36 is a side view showing another modification of the embodiment shown in FIG. 34.

A second link mechanism 900 shown in FIG. 36 is arranged between a first link mechanism 921 and the lower end of a rod 925. The lower end of a shock absorber 922 is connected so as to be forwardly and rearwardly rockable to an upper fork 911 through a shaft 931. The second link mechanism 900 is formed of a first link 901, a second link 902 and a third link 903. In this embodiment, a tip 919c extended upwardly over a connecting part 919a with the upper fork 911 on a front arm 919 comprises the first link 901. A similar tip may be formed on a rear arm 920 and employed as the first link. The second link 902 is bent to be formed into a V-shape on the side and includes a forward extension 902a and an upward extension 902b. The first link 901 is connected to the bent part of second link 902, and the lower end of the rod 925 is connected to the upward extension 902b. The third link 903 crossing the first link 901 in the forward-and-rearward direction connects the forward extension 902a of the second link 902 and the upper fork 911 with each other. Further, the upper end of the rod 925 is connected to the upper end of the shock absorber 922 and the front end of a lever 933 connected at its rear end so as to be vertically rockable to the top of the upper fork 911 through a shaft 932 is connected to the upper end of the shock absorber 922.

By a counterclockwise rotation of the arm 919 with the connecting part 919a as a center due to an upward movement of a front wheel 917, the second link 902 will be moved downwardly and will be rotated counterclockwise by the third link 903. Therefore, the pulling down of the rod 925 and the compression of the shock absorber 922 will be a resultant of the movement and rotation and the shock absorbing force of the shock absorber 922 will have a progressive characteristic.

The links 802, 852 and 902 rotating while moving up or down with the deformation of the first link mechanisms 821, 871 and 921 are included respectively in the second link mechanisms 800, 850 and 900 shown in the respective embodiments illustrated in FIGS. 33 through 36 and, by the movement of such links 802, 852 and 902, the shock absorbing force characteristic of the shock absorbers 822, 872 and 922 can be made progressive.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:
1. A front wheel suspension system for motorcycles wherein at least one first link mechanism forming a quadrilateral on the side is formed by connecting an upper fork laterally pivotally connected to a vehicle body and a lower fork supporting a front wheel with each other through a front arm and a rear arm and wherein movement following the irregularities of a road surface of the front wheel with a deformation of the first link mechanism is absorbed and cushioned by at least one front shock absorber, wherein:
   only one said front shock absorber is provided;
   said shock absorber is disposed adjacent an upper part of a front surface of said upper fork;
   said first link mechanism and said shock absorber are connected with each other through at least one rod; and
   one arm of said front and rear arms includes a tip pivotally connected to the lower end of said rod, said tip being disposed on an extension of said one arm extending substantially beyond a pivotal connection between said one arm and said upper fork.
2. A front wheel suspension system for motorcylces according to claim 1, wherein:
   two of said first link mechanisms are provided;
   said two first link mechanisms have substantially the same structure and deformation characteristics, and are provided on the right and left, respectively;
   two of said rods are provided on the right and left, respectively; and
   said two first link mechanisms are connected with said shock absorber through said two rods.
3. A front wheel suspension system for motorcycles according to claim 1, wherein:
   the upper end of said shock absorber is connected to said upper fork and the upper end of said rod and the lower end of said shock absorber are connected with each other through lever means for turning the load-transmitting direction.
4. A front wheel suspension system for motorcycles according to claim 3, wherein:
   said lever means includes members thereof which are extended in the reverse directions from the center of rotation of said lever means at a selectively variable open angle with respect to each other.
5. A front wheel suspension system for motorcycles according to claim 3, wherein:
   said lever means comprises a rotary shaft, a front lever member and a rear lever member;
   said rotary shaft is rotatably inserted through a bearing hole fromed in the right-and-left direction through said upper fork; and
   said front lever member and said rear lever member are secured to a shaft end of said rotary shaft.

6. A front wheel suspension system for motorcycles according to claim 1, wherein:
said lower fork includes two connecting parts which are connected respectively to said front arm and said rear arm and with each other through an interconnecting portion having a smoothly curved side contour.

7. A front wheel suspension system for motorcycles according to claim 1, wherein:
said shock absorber comprises a damper having a relatively thick upper part pivotally connected to said upper fork.

8. A front wheel suspension system for motorcycles according to claim 7, wherein:
a gas chamber is formed within the upper part of said damper.

9. A front wheel suspension system for motorcycles according to claim 1, wherein:
a cushion member is fitted to the front surface of said front arm.

10. A front wheel suspension system for motorcycles according to claim 1, wherein:
a plate is fixed to a brake panel provided on an axle of said front wheel; and
said rod is arranged between said plate and one of said front an rear arms.

11. A front wheel suspension system for motorcycles according to claim 10, wherein:
said rod is connected to one of a plurality of connecting points on said plate.

12. A front wheel suspension system for motorcycles according to claim 1, wherein:
said lower fork includes right and left members, the rear ends of said right and left members of said lower fork being connected with each other through a cross-member.

13. A front wheel suspension system for motorcycles according to claim 1, wherein:
an identification plate projecting forwardly of the front surface of said upper fork is fitted to said upper fork;
a hole and a hook part are formed at vertically spaced positions in the rear part of said identification plate;
a bolt inserted in said hole is threadedly fastened to said upper fork; and
said hook part is engaged with a member integral with said upper fork.

14. A front wheel suspension system for motorcycles according to claim 13, wherein:
said hole comprises a slot which is elongated in the vertical direction.

15. A front wheel suspension system for motorcycles according to claim 13, wherein:
said hook part is formed in the upper part of said identification plate and is arranged in the right-and-left direction over a handle of said motorcycle.

16. A front wheel suspension system for motorcycles according to claim 13, wherein:
an identification plate projecting forwardly of the front surface of said upper fork is fitted to said upper fork;
a heat radiating device is arranged between said upper fork and said identification plate;
said identification plate is provided with ventilating holes formed in the front surface thereof;
an indicating plate having a wind shielding effect is fitted to the front surface of said identification plate;
said heat radiating device is arranged just behind said indicating plate; and
at least one wind guiding member for guiding wind having passed through said ventilating holes to said heat radiating device is mounted on the back surface of said identification plate and at the side part of said indicating plate.

17. A front wheel suspension system for motorcycles according to claim 16, wherein:
said heat radiating device comprises a radiator for a motorcycle engine of a water-cooled type.

18. A front wheel suspension system for motorcycles according to claim 1, wherein:
a cushion member is fitted to the upper surface of an extension of said lower fork extending forwardly of a part of said lower fork to which the lower end of said arm is connected.

19. A front wheel suspension system for motorcycles according to claim 10, wherein:
said rod is connected to one of a plurality of connecting points on one of said arms.

20. A front wheel suspension system for motorcycles wherein at least one first link mechanism forming a quadrilateral on the side is formed by connecting an upper fork laterally pivotally connected to a vehicle body and a lower fork supporting a front wheel with each other through a front arm and a rear arm and wherein movement following the irregularities of a road surface of the front wheel with a deformation of the first link mechanism is absorbed and cushioned by at least one front shock absorber, wherein:
only one said front shock absorber is provided;
said shock absorber is disposed adjacent an upper part of a front surface of said upper fork;
said first link mechanism and said shock absorber are connected with each other through at least one rod; and
the lengths of said rear arm and said rod are selectively adjustable.

21. A front wheel suspension system for motorcycles wherein at least one first link mechanism forming a quadrilateral on the side is formed by connecting an upper fork laterally pivotally connected to a vehicle body and a lower fork supporting a front wheel with each other through a front arm and a rear arm and wherein movement following the irregularities of a road surface of the front wheel with a deformation of the first link mechanism is absorbed and cushioned by at least one front shock absorber, wherein:
only one said front shock absorber is provided;
said shock absorber is disposed adjacent an upper part of a front surface of said upper fork;
said first link mechanism and said shock absorber are connected with each other through at least one rod;
at least one bush is fixedly inserted in one of said arms;
a collar having an outside diameter substantially closely fitting the inside diameter of said bush is rotatably inserted in said bush;
a shaft having a male threaded portion at the tip thereof is inserted in said collar from the lower end of said upper fork; and
said male threaded portion is threadedly fastened in a nut inserted in said collar to thereby connect said one of said arms to said upper fork.

22. A front wheel suspension system for motorcycles according to claim 21, wherein:

said upper fork has a forked part comprising an inner projection and an outer projection;

one of said arms is fitted to said forked part;

said male threaded portion of said shaft is inserted in said collar from one of said projections; and said nut has a tube part inserted in said collar from the other of said projections.

23. A front wheel suspension system for motorcycles according to claim 22, wherein:

two bushes are pressed in one of said arms respectively from both right and left sides and have single-side flanges projecting out of both side surfaces of said arm;

said collar has a single-side flange projecting on the side surface of one of said flanges of said bushes; and a thrust washer is butted on the end surface opposite the flange side of said collar.

24. A front wheel suspension system for motorcycles wherein at least one first link mechanism forming a quadrilateral on the side is formed by connecting an upper fork laterally pivotally connected to a vehicle body and a lower fork supporting a front wheel with each other through a front arm and a rear arm and wherein movement following the irregularities of a road surface of the front wheel with a deformation of the first link mechanism is absorbed and cushioned by at least one front shock absorber, wherein:

only one said front shock absorber is provided;

said shock absorber is disposed adjacent an upper part of a front surface of said upper fork;

said first link mechanism and said shock absorber are connected with each other through at least one rod;

a plate is fixed to a brake panel provided on an axle of said front wheel;

said rod is arranged between said plate and one of said front and rear arms;

said rod is connected to one of a plurality of connecting points on said plate; and a plurality of holes for connecting said rod, provided at vertically spaced intervals, are respectively formed at the connecting points.

25. A front wheel suspension system for motorcycles wherein at least one first link mechanism forming a quadrilateral on the side is formed by connecting an upper fork laterally pivotally connected to a vehicle body and a lower fork supporting a front wheel with each other through a front arm and a rear arm and wherein movement following the irregularities of a road surface of the front wheel with a deformation of the first link mechanism is absorbed and cushioned by at least one front shock absorber, wherein:

only one said front shock absorber is provided;

said shock absorber is disposed adjacent an upper part of a front surface of said upper fork;

said first link mechanism and said shock absorber are connected with each other through at least one rod;

said lower fork includes right and left members, the rear ends of said right and left members of said lower fork being connected with each other through a cross-member; and said cross-member is removable to permit selective variability of the rigidity thereof.

26. A front wheel suspension system for motorcycles according to claim 25, wherein:

said cross-member is connected substantially at respective points at which said front arm and said rear arm are connected to said lower fork.

27. A front wheel suspension system for motorcycles wherein at least one first link mechanism forming a quadrilateral on the side is formed by connecting an upper fork laterally pivotally connected to a vehicle body and a lower fork supporting a front wheel with each other through a front arm and a rear arm and wherein movement following the irregularities of a road surface of the front wheel with a deformation of the first link mechanism is absorbed and cushioned by at least one front shock absorber, wherein:

only one said front shock absorber is provided;

said shock absorber is disposed adjacent an upper part of a front surface of said upper fork;

said first link mechanism and said shock absorber are connected with each other through at least one rod;

one arm of said front and rear arms includes a tip pivotally connected to the lower end of said rod, said tip being disposed on an extension of said one arm extending substantially beyond a pivotal connection between said one arm and said upper fork; and the lower end of said shock absorber is connected to said upper fork and the upper end of said rod is connected to the upper end of said shock absorber.

28. A front wheel suspension system for motorcycles wherein at least one first link mechanism forming a quadrilateral on the side is formed by connecting an upper fork laterally pivotally connected to a vehicle body and a lower fork supporting a front wheel with each other through a front arm and a rear arm and wherein movement following the irregularities of a road surface of the front wheel with a deformation of the first link mechanism is absorbed and cushioned by at least one front shock absorber, wherein:

only one said front shock absorber is provided;

said shock absorber is disposed adjacent an upper part of a front surface of said upper fork;

said first link mechanism and said shock absorber are connected with each other through at least one rod; and at least one of respective pivotal connecting parts between said upper and lower forks and said front and rear arms is covered with a flexible cover.

29. A front wheel suspension system for motorcycles according to claim 28, wherein:

a window hole is formed on the side surface of said cover.

30. A front wheel suspension system for motorcycles wherein at least one first link mechanism forming a quadrilateral on the side is formed by connecting an upper fork laterally pivotally connected to a vehicle body and a lower fork supporting a front wheel with each other through a front arm and a rear arm and wherein movement following the irregularities of a road surface of the front wheel with a deformation of the first link mechanism is absorbed and cushioned by at least one front shock absorber, wherein:

only one said front shock absorber is provided;

said shock absorber is disposed adjacent an upper part of a front surface of said upper fork;

said first link mechanism and said shock absorber are connected with each other through at least one rod;

an identification plate projecting forwardly of the front surface of said upper fork is fitted to said upper fork; and at least one headlight device is combined integrally with said identification plate.

31. A front wheel suspension system for motorcycles wherein at least one first link mechanism forming a quadrilateral on the side is formed by connecting an upper fork laterally pivotally connected to a vehicle body and a lower fork supporting a front wheel with each other through a front arm and a rear arm and wherein movement following the irregularities of a road surface of the front wheel with a deformation of the first link mechanism is absorbed and cushioned by at least one front shock absorber, wherein:

only one said front shock absorber is provided;

said shock absorber is disposed adjacent an upper part of a front surface of said upper fork;

said first link mechanism and said shock absorber are connected with each other through at least one rod;

an identification plate projecting forwardly of the front surface of said upper fork is fitted to said upper fork;

a heat radiating device is arranged between said upper fork and said identification plate;

said identification plate is provided with ventilating holes formed in the front surface thereof;

an indicating plate having a wind shielding effect is fitted to the front surface of said identification plate;

said heat radiating device is arranged just behind said indicating plate;

at least one wind guiding member for guiding wind having passed through said ventilating holes to said heat radiating device is mounted on the back surface of said identification plate and at the side part of said indicating plate; and said heat radiating device comprises said shock absorber.

32. A front wheel suspension system for motorcycles according to claim 31, wherein:

said shock absorber includes a damper; and a shock absorber medium is fed to said damper from a sub-tank fitted to said upper fork on the side of said shock absorber.

* * * * *